United States Patent
Kobayashi

(10) Patent No.: US 8,975,846 B2
(45) Date of Patent: *Mar. 10, 2015

(54) MOTOR VOLTAGE CONVERSION CONTROL DEVICE

(75) Inventor: Masashi Kobayashi, Gotenba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/380,166

(22) PCT Filed: Apr. 18, 2011

(86) PCT No.: PCT/JP2011/059551
§ 371 (c)(1),
(2), (4) Date: Dec. 22, 2011

(87) PCT Pub. No.: WO2012/144002
PCT Pub. Date: Oct. 26, 2012

(65) Prior Publication Data
US 2014/0042939 A1 Feb. 13, 2014

(51) Int. Cl.
*H02P 27/00* (2006.01)
*H02P 6/00* (2006.01)
(Continued)

(52) U.S. Cl.
CPC ............... *H02P 6/002* (2013.01); *H02P 27/08* (2013.01); *H02P 5/74* (2013.01); *B60L 11/1803* (2013.01); *H02P 5/68* (2013.01); *Y02T 10/7005* (2013.01); *Y02T 10/70* (2013.01); *Y02T 10/648* (2013.01)
USPC ........ 318/400.3; 318/810; 318/812; 318/530; 318/808; 318/635

(58) Field of Classification Search
USPC .............. 318/400.3, 810, 812, 530, 808, 635, 318/650, 71, 400.22, 108
See application file for complete search history.

(56) References Cited

U.S. PATENT DOCUMENTS 8,467,199 B2 * 6/2013 Lee et al. .................... 363/21.02
2007/0216323 A1 9/2007 Ishikawa et al.
(Continued)

FOREIGN PATENT DOCUMENTS

CN 103250342 8/2013
DE 10 2007 025 210 12/2007
(Continued)

OTHER PUBLICATIONS

U.S. Appl. No. 13/991,643, filed Jun. 5, 2013.

*Primary Examiner* — Eduardo Colon Santana
*Assistant Examiner* — Iftekhar Mustafa
(74) *Attorney, Agent, or Firm* — Finnegan, Henderson, Farabow, Garrett & Dunner, LLP

(57) ABSTRACT

A control device performs voltage conversion control on a voltage conversion circuit between a power supply and motor control circuits which control a plurality of motors. The control device includes sampling units for sampling a DC voltage after voltage conversion, target voltage setting units for setting target voltages $VH_{T1}$ and $VH_{T2}$ of the plurality of motors, selection unit for selecting a target voltage $VH_T$ to be converted by the voltage conversion circuit from a plurality of target voltages $VH_{T1}$ and $VH_{T2}$, generating unit for generating a sampling timing TS on the basis of a gate signal $GS_1$ or $GS_2$ of one of the motors with the target voltage which has not been selected, and control unit for performing the voltage conversion control using the DC voltage sampled by the sampling units at the sampling timing TS in response to each sampling timing request DS in the voltage conversion control.

5 Claims, 11 Drawing Sheets

(51) Int. Cl.
*H02P 27/08* (2006.01)
*H02P 5/74* (2006.01)
*B60L 11/18* (2006.01)
*H02P 5/68* (2006.01)

(56) References Cited

U.S. PATENT DOCUMENTS

2007/0290633 A1 12/2007 Atarashi et al.
2011/0307136 A1* 12/2011 Komata et al. .................. 701/22
2013/0249451 A1 9/2013 Kobayashi

FOREIGN PATENT DOCUMENTS

| | | |
|---|---|---|
| JP | 2005-341698 | 12/2005 |
| JP | 2007-236110 | 9/2007 |
| JP | 2009-112164 | 5/2009 |
| JP | 2009-201195 | 9/2009 |
| JP | 2010-29023 | 2/2010 |
| WO | WO 03/015254 A1 | 2/2003 |

* cited by examiner

Fig.3
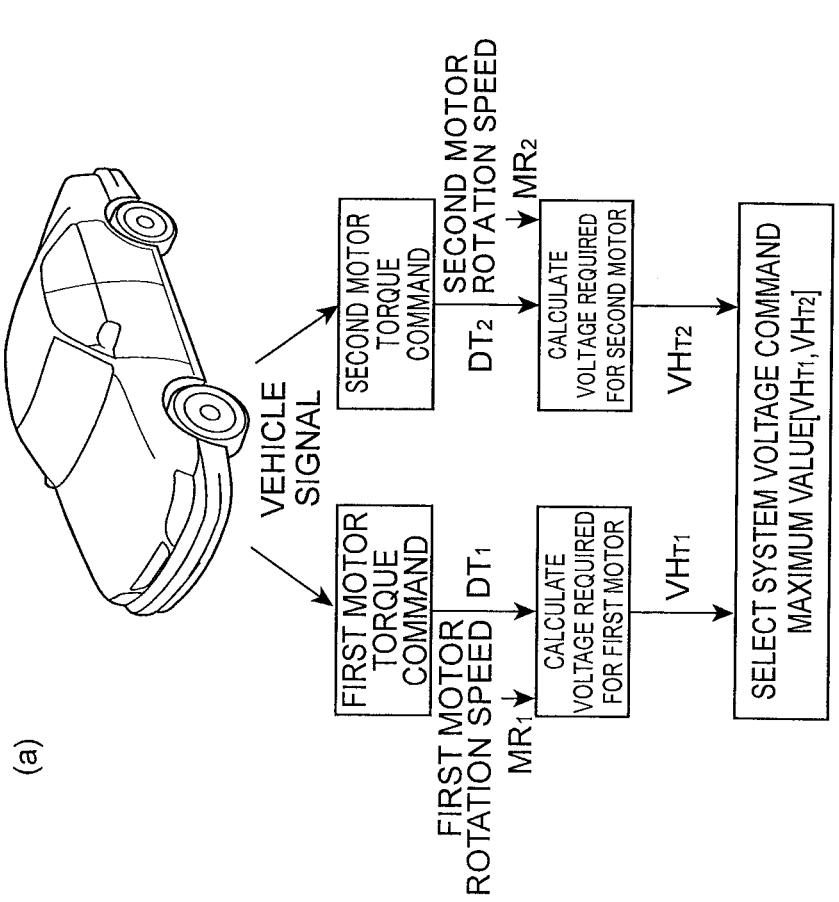
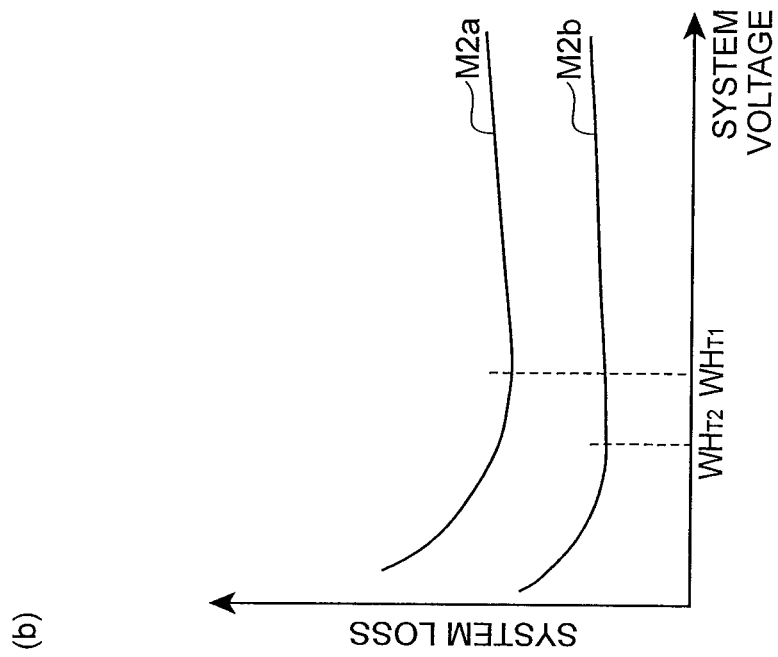

MOTOR VOLTAGE CONVERSION CONTROL DEVICE

CROSS-REFERENCE TO RELATED APPLICATIONS

This application is a national phase application of International Application No. PCT/JP2011/059551, filed Apr. 18, 2011, the contents of which are incorporated herein by reference.

TECHNICAL FIELD

The present invention relates to a motor voltage conversion control device that performs voltage conversion control on a voltage conversion circuit which converts a DC voltage of a power supply into an input DC voltage required to drive motors between the power supply and a motor control circuit which controls a plurality of motors.

BACKGROUND ART

In recent years, for example, hybrid vehicles or electric vehicles have been developed as vehicles for protecting the environment. These vehicles include a motor as a driving source. There is a vehicle including a plurality of motors (motor generators or generators). An AC motor is used as the motor and an inverter converts DC power into three-phase AC power. The motor is driven by the three-phase AC power. A high voltage is needed in order to rotate the motor at a high speed or with high torque. A boost converter is used to boost the DC voltage of a battery to a DC high voltage and the DC high voltage is supplied to the inverter. Therefore, in the vehicle, inverter control for controlling switching between switching elements of the inverter and boost control for controlling switching between switching elements of the boost converter are performed in order to control the motor. A smoothing capacitor is provided between the boost converter and the inverter and a voltage sensor detects the voltage (DC high voltage boosted by the boost converter) between both ends of the smoothing capacitor. In the boost control, the DC high voltage detected by the voltage sensor is used to obtain a target voltage required to drive the motor. In particular, a system including a plurality of motors sets the target voltages required to drive the motors and selects a target voltage of the system from a plurality of target voltages.

Patent Literature 1 discloses a vehicle control device including two motor generators. The vehicle control device generates a gate signal for controlling switching elements of a boost converter on the basis of the sensor value of the voltage from a DC power supply, the sensor value of the voltage between both ends of a smoothing capacitor, a motor torque command value of each motor generator, and the number of rotations of the motor, and generates a gate signal for controlling switching elements of an inverter in each motor generator on the basis of the sensor value of the voltage between both ends of the smoothing capacitor, a motor torque command value, and the sensor value of a motor current.

CITATION LIST

Patent Literature

[Patent Literature 1] Japanese Unexamined Patent Application Publication No. 2009-201195

SUMMARY OF INVENTION

Technical Problem

There is a demand for a reduction in costs and a size in the development of vehicles. Therefore, it is necessary to reduce the capacitance of a smoothing capacitor between the boost converter and the inverter. As the capacitance of the smoothing capacitor is reduced, the ratio of the input and the output of charge to and from the smoothing capacitor due to switching between the switching elements of the inverter increases. When the smoothing capability of the smoothing capacitor is insufficient, a large variation occurs in the voltage between both ends of the smoothing capacitor, which results in the pulsation of the boosted DC high voltage.

Specifically, when an inverter control carrier frequency (switching frequency for turning on/off the switching elements of the inverter) is temporarily reduced due to, for example, restrictions in a traveling state (for example, when the temperature of the switching elements of the inverter is high), the ON/OFF period of the switching element increases and switching noise in the inverter control is superimposed as a large variation (pulse component) on the voltage (boosted DC high voltage) between both ends of the smoothing capacitor. FIG. 10 shows a variation $VH_{2.5}$ in the DC high voltage over time when the carrier frequency is 2.5 kHz and a variation $VH_{1.25}$ in the DC high voltage over time when the carrier frequency is 1.25 kHz. A curved line represented by $VH_F$ indicates a variation in a filter value obtained by filtering the variations $VH_{2.5}$ and $VH_{1.25}$ in the DC high voltage over time with a predetermined time constant over time. As can be seen from FIG. 10, a large pulse component is superimposed on the boosted DC high voltage when the carrier frequency is low rather than when the carrier frequency is high. As the carrier frequency increases, current pulse components of the motor is reduced, but the amount of heat generated from the switching elements increases. As a result, a system loss increases.

In addition, the target voltage required to drive the motor varies depending on the number of rotations or torque of the motor. When the target voltage is high and the boosted DC high voltage is higher than a motor-induced voltage, the pulse component is superimposed on the DC high voltage according to the voltage difference.

FIG. 11(a) shows the relation between a motor-induced voltage Vemf and voltages $VH_H$ and $VH_L$ when the DC high voltage is at a high level and a low level. When the voltage differences $Vdef_{H1}$ and $Vdef_{H2}$ between the DC high voltage $VH_H$ at a high level and the motor-induced voltage Vemf are compared with the voltage differences $Vdef_{L1}$ and $Vdef_{L2}$ between the DC high voltage $VH_L$ at a low level and the motor-induced voltage Vemf, the voltage difference Vdef when the DC high voltage $VH_H$ is at a high level is more than that when the DC high voltage $VH_H$ is at a low level. As the voltage difference Vdef increases, a variation superimposed on the motor current increases.

FIG. 11(b) shows a carrier signal SC and a duty signal SD in inverter control. A gate signal for turning on/off the switching elements of the inverter is generated according to the intersection point between the carrier signal SC and the duty signal SD. FIG. 11(c) shows a target current $MI_T$ of the motor, the actual current $MI_H$ of the motor in the case of a large voltage difference $Vdef_H$, and the actual current $MI_L$ of the motor in the case of a small voltage difference $Vdef_L$. The actual currents $MI_H$ and $MI_L$ of the motor vary with respect to the target current $MI_T$, and a pulse component caused by the influence of switching between the switching elements of the inverter is superimposed. As can be seen from FIGS. 11(b)

and 11(c), increase and decrease in the pulse components are changed at the intersection point (the ON/OFF switching timing of the gate signal) between the carrier signal SC and the duty signal SD. As can be seen from FIG. 11(c), as the voltage difference Vdef increases, the pulse components superimposed on the motor current increases. FIG. 11(d) shows a boosted DC high voltage VH in the actual current $MI_H$ of the motor in the case of the large voltage difference $Vdef_H$. The DC high voltage VH pulsates with the pulsation of the actual current of the motor and is highly variable.

That is, the pulse component which is superimposed on the motor current by the influence of switching in inverter control is determined by the voltage difference Vdef between the DC high voltage VH and the motor-induced voltage Vemf and the carrier frequency of the inverter control. Therefore, when the voltage difference Vdef is large and the inverter frequency is low, the pulse components superimposed on the motor current increases. When the capacitance of the smoothing capacitor is small and the pulse components superimposed on the motor current increases, the smoothing capability of the smoothing capacitor is insufficient and a large variation occurs in the voltage between both ends of the smoothing capacitor. As a result, the boosted DC high voltage pulsates.

FIG. 11(d) shows the actual DC high voltage VH, the expected value (an intermediate value between the peak and trough of the DC high voltage VH and a DC high voltage without a pulse component) $VH_E$ of the DC high voltage, and sampling timing request signals $DS_1$, $DS_2$, and $DS_3$ of the DC high voltage in boost control. The sampling timing request signals $DS_1$, $DS_2$, and $DS_3$ are output with each sampling timing period PS. In the boost control according to the related art, when the sampling timing request signals $DS_1$, $DS_2$, and $DS_3$ are output, the voltage sensor detects the voltage between both ends of the smoothing capacitor and control is performed using the detected DC high voltages $VH_1$, $VH_2$, and $VH_3$ such that a target voltage is obtained. However, for example, in the case of the DC high voltage $VH_1$ detected using the sampling timing request signal $DS_1$, a large pulse component is added to the DC high voltage $VH_1$ by the influence of the pulse component of the motor current caused by switching noise in inverter control, and there is a large difference between the DC high voltage $VH_1$ and the expected value $VH_{E1}$ of the DC high voltage. When the DC high voltage $VH_1$ is used to perform boost control, the boost control is unstable.

In the control disclosed in Patent Literature 1, the gate signal for controlling the switching elements of the boost converter and the gate signal for controlling the switching elements of the inverter in each motor generator are independently generated and the boost control does not cooperate with the inverter control. Therefore, when the DC high voltage boosted by the boost converter pulsates, the pulse component is included in the sensor value of the voltage between both ends of the smoothing capacitor used for boost control. As a result, the boost control is unstable.

In particular, in the system including a plurality of motors, the target voltages required to drive the motors are different from each other. In the general control, the highest target voltage among a plurality of target voltages is selected as the target voltage of the system. In the boost control, the DC high voltage is controlled to be the highest target voltage. Therefore, in the motors with low target voltages which are not selected as the target voltage of the system, the voltage difference Vdef between the DC high voltage VH and the motor-induced voltage Vemf is large. Therefore, the pulse components superimposed on the motor current increases.

An object of the invention is to provide a motor voltage conversion control device that stably performs voltage conversion control even when an input DC voltage of a motor pulsates due to the pulsation of a motor current in a system including a plurality of motors.

Solution to Problem

According to an aspect of the invention, there is provided a motor voltage conversion control device that performs voltage conversion control on a voltage conversion circuit which converts a DC voltage of a power supply into an input DC voltage required to drive motors between a motor control circuit which controls a plurality of motors and the power supply. The motor voltage conversion control device includes: sampling unit for detecting a voltage between both ends of a capacitor which is provided between the motor control circuit and the voltage conversion circuit and sampling the input DC voltage converted by the voltage conversion circuit; target voltage setting unit for setting a target voltage of the input DC voltage of each of the motors; selection unit for selecting the target voltage to be converted by the voltage conversion circuit among a plurality of target voltages set by the target voltage setting unit; sampling timing generating unit for generating a sampling timing when the input DC voltage converted by the voltage conversion circuit is sampled, on the basis of a gate signal for motor control for any one of the motors with the target voltages which have not been selected by the selection unit; and control unit for performing the voltage conversion control using the input DC voltage sampled by the sampling unit at the sampling timing which is generated by the sampling timing generating unit in response to each sampling timing request in the voltage conversion control.

The motor voltage conversion control device performs voltage conversion control on the voltage conversion circuit in a system including, for example, a plurality of motors, a motor control circuit, a voltage conversion circuit, and a power supply. A capacitor is provided between the motor control circuit and the voltage conversion circuit. The sampling unit detects the voltage between both ends of the capacitor and so as to sample the input DC voltage converted by the voltage conversion circuit. In addition, in the motor voltage conversion control device, the target voltage setting unit sets the target voltage of the input DC voltage required to drive each motor and the selection unit selects the target voltage to be converted by the voltage conversion circuit from the target voltages of each motor. Then, the motor voltage conversion control device performs control using the input DC voltage sampled by the sampling unit such that the input DC voltage becomes the target voltage selected by the selection unit. The motors include a motor having a driving function and a motor generator or a generator having a power generation function.

The input DC voltage of the motor pulsates due to the pulsation of a motor current. A pulse component superimposed on the motor current is affected by switching in motor control and is determined by the gate signal (a signal generated in motor control and a gate signal for controlling switching between the switching elements of the motor control circuit) in motor control and the voltage difference between the input DC voltage of the motor and a motor-induced voltage. Therefore, the peak and trough of the motor current on which the pulse component is superimposed are the ON/OFF switching timings of the gate signal. Therefore, the intermediate value (that is, the input DC voltage from which the pulse component is removed and the expected value of the input DC voltage which is for performing stable voltage conversion control) between the peak and trough of the input DC voltage on which the pulse component is superimposed is the intermediate timing between the continuous switching timings of the gate signal. As described above, the system including a plurality of motors sets the target voltage of the input DC voltage of each motor and selects one target voltage as the target voltage of the system from the target voltages of each motor. Therefore, in the motors with the target voltages which have not been selected as the target voltage of the system, the voltage difference between the input DC voltage and the motor-induced voltage is more than that in the motor with the target voltage selected as the target voltage of the system and the pulse components superimposed on the motor current increases.

In the motor voltage conversion control device, the sampling timing generating unit generates the sampling timing for sampling the input DC voltage on the basis of the gate signal for motor control for any one of the motors with the target voltages which have not been selected by the selection unit. When the number of motors with the target voltages which have not been selected by the selection unit is one, the gate signal of the one motor is used. When the number of motors with the target voltages which have not been selected by the selection unit is two or more, the gate signal of the motor which has the largest effect on the pulse component of the motor current is selected from the gate signals of the plurality of motors. In the motor voltage conversion control device, the control unit performs control so as to obtain the target voltage of the system using the input DC voltage (actual voltage) which is sampled by the sampling unit at the sampling timing generated by the sampling timing generating unit, in response to each sampling timing request (timing when the input DC voltage is appropriately output in the voltage conversion control and is not synchronized with the gate signal in motor control) for the input DC voltage in the voltage conversion control. As such, the motor voltage conversion control device samples the input DC voltage used in the voltage conversion control, considering the gate signal of the motor with the target voltage which has not been selected as the target voltage of the input DC voltage converted by the voltage conversion circuit. In this way, even when the input DC voltage of the motor pulsates, it is possible to sample the input DC voltage close to the expected value of the input DC voltage in response to the sampling timing request. Therefore, the difference between the expected value of the input DC voltage and the sampling value which is actually used in the voltage conversion control is reduced and it is possible to perform stable voltage conversion control. As a result, it is possible to reduce the capacitance of the capacitor and reduce the cost and size of the system including a plurality of motors.

In the motor voltage conversion control device according to the invention, the sampling timing generating unit may generate the sampling timing at the ON/OFF switching timing of the gate signal. Whenever the sampling timing generating unit generates the sampling timing, the sampling unit may calculate an average value between the input DC voltage converted by the voltage conversion circuit at a current sampling timing and the input DC voltage converted by the voltage conversion circuit at a previous sampling timing. The control unit may perform the voltage conversion control using the average value of the input DC voltages which is calculated by the sampling unit immediately before the sampling timing request, in response to each sampling timing request in the voltage conversion control.

In the motor voltage conversion control device, the sampling timing generating unit generates the sampling timing at the ON/OFF switching timing of the gate signal. In the motor voltage conversion control device, the sampling unit calculates the average value between the input DC voltage which is converted by the voltage conversion circuit at the current sampling timing and the input DC voltage which is converted by the voltage conversion circuit at the previous sampling timing, at each sampling timing, and samples the average value of the input DC voltages. The average value of the input DC voltages sampled at the continuous switching timings (continuous rising timing and falling timing) of the gate signal is the intermediate value between the peak and trough of the input DC voltage. In the motor voltage conversion control device, the control unit performs controls so as to obtain a target voltage using the average value of the input DC voltages which is calculated by the sampling unit immediately before the sampling timing request, in each sampling timing request. The average value of the input DC voltages sampled at the continuous switching timings of the gate signal immediately before the sampling timing request is close to the expected value of the input DC voltage in the case of the sampling timing request. As such, the motor voltage conversion control device samples the average value of the input DC voltages sampled at the continuous switching timings of the gate signal for motor control. In this way, even when the input DC voltage of the motor pulsates, it is possible to perform voltage conversion control using the input DC voltage close to the expected value of the input DC voltage in response to the sampling timing request. Therefore, it is possible to perform stable voltage conversion control.

The motor voltage conversion control device according to the invention may further include AD conversion unit for converting the input DC voltage converted by the voltage conversion circuit from an analog value to a digital value whenever the sampling timing generating unit generates the sampling timing. When the ON/OFF switching time of the gate signal is shorter than an AD conversion time of the AD conversion unit, the sampling timing generating unit may stop the generation of the sampling timing and the AD conversion unit may not perform the AD conversion.

In the motor voltage conversion control device, whenever the sampling timing generating unit generates the sampling timing, the AD conversion unit converts the input DC voltage converted by the voltage conversion circuit from an analog value to a digital value and outputs the digital input DC voltage to the sampling unit. When the ON/OFF switching time of the gate signal is shorter than the time required for the AD conversion unit to perform the AD conversion, the sampling timing generating unit generates the sampling timing before the AD conversion of the AD conversion unit ends. In this case, even when the sampling timing is generated, the AD conversion unit does not perform the AD conversion and the process of the sampling unit is not performed. In the motor voltage conversion control device, when the ON/OFF switching time of the gate signal is shorter than the AD conversion time of the AD conversion unit, the sampling timing generating unit stops the generation of the sampling timing. In this case, the AD conversion unit does not perform the AD conversion at the current switching timing of the gate signal. Therefore, the sampling unit does not calculate the average value using the input DC voltage at the current switching timing of the gate signal. As a result, the latest sampling value of the sampling unit is the average value (previous value) between the input DC voltage at the previous switching timing of the gate signal and the input DC voltage at the switching time before the previous switching timing of the gate signal. Since the average value (previous value) is the intermediate value between the peak and trough of the input DC voltage, it is close to the expected value of the input DC voltage. Therefore, it is possible to perform stable voltage conversion control.

The motor voltage conversion control device according to the invention may further include AD conversion unit for converting the input DC voltage converted by the voltage conversion circuit from an analog value to a digital value whenever the sampling timing generating unit generates the sampling timing. When the ON/OFF switching time of the gate signal is shorter than an AD conversion time of the AD conversion unit, the sampling timing generating unit may generate the sampling timing immediately after the AD conversion of the AD conversion unit ends, and the AD conversion unit may start the AD conversion immediately after the AD conversion ends.

The motor voltage conversion control device according to the invention includes the AD conversion unit, similarly to the above-mentioned motor voltage conversion control device. When the ON/OFF switching time of the gate signal is shorter than the AD conversion time of the AD conversion unit, the same problem as described above arises. Therefore, in the motor voltage conversion control device, when the ON/OFF switching time of the gate signal is shorter than the AD conversion time of the AD conversion unit, the sampling timing generating unit generates the sampling timing immediately after the AD conversion of the AD conversion unit ends. In this case, the AD conversion unit starts the AD conversion immediately after the AD conversion ends. Therefore, the sampling unit calculates the average value between the input DC voltage at a timing which is slightly later than the current switching timing of the gate signal and the input DC voltage at the previous switching timing of the gate signal. The input DC voltage at the timing which is slightly later than the current switching timing of the gate signal is used, but there is no large difference between the expected value of the input DC voltage and the average value between the input DC voltage at the timing which is slightly later than the current switching timing and the input DC voltage at the previous switching timing. Therefore, it is possible to perform stable voltage conversion control.

In the motor voltage conversion control device according to the invention, the plurality of motors may be two motors. The target voltage setting unit may set the target voltages of the two motors. The selection unit may select the target voltage to be converted by the voltage conversion circuit from the target voltages of the two motors set by the target voltage setting unit. The sampling timing generating unit may generate the sampling timing when the input DC voltage converted by the voltage conversion circuit is sampled, on the basis of a gate signal of the motor with the target voltage which has not been selected by the selection unit.

Advantageous Effects of Invention

According to the invention, the motor voltage conversion control device samples the input DC voltage used in voltage conversion control, considering the gate signal of the motor with the target voltage which has not been selected as the target voltage of the input DC voltage converted by the voltage conversion circuit. In this way, even when the input DC voltage of the motor pulsates, it is possible to sample the input DC voltage close to the expected value of the input DC voltage in response to the sampling timing request. Therefore, the difference between the expected value of the input DC voltage and the sampling value which is actually used in the voltage conversion control is reduced and it is possible to perform stable voltage conversion control.

BRIEF DESCRIPTION OF DRAWINGS

FIG. 3 is a diagram illustrating a method of determining the target voltage in the two-motor system. FIG. 3(a) shows the flow of the determining method and FIG. 3(b) shows an example of a map of the system voltages and system loss of two motors.

FIG. 4(a) is a diagram illustrating the relation between the DC high voltage at a high level and a low level and a motor-induced voltage, FIG. 4(b) shows a carrier signal and a duty signal in inverter control, FIG. 4(c) shows a gate signal in the inverter control, FIG. 4(d) shows the target current and the actual current of the motor, and FIG. 4(e) shows the DC high voltage and a sampling timing request signal.

FIG. 7(a) shows the DC high voltage, FIG. 7(b) shows a gate signal in inverter control, FIG. 7(c) shows the switching timing of the gate signal, FIG. 7(d) shows an AD conversion start signal to an AD converter, FIG. 7(e) shows an averaging inhibition signal, FIG. 7(f) shows an AD conversion end signal from the AD converter, FIG. 7(g) shows an AD-converted value of the AD converter, and FIG. 7(h) shows a binary average value.

FIG. 9(a) shows the DC high voltage, FIG. 9(b) shows a gate signal in inverter control, FIG. 9(c) shows the switching timing of the gate signal, FIG. 9(d) shows an AD conversion start signal to an AD converter, FIG. 9(e) shows an AD conversion end signal from the AD converter, FIG. 9(f) shows an AD-converted value of the AD converter, and FIG. 9(g) is a binary average value.

FIG. 11(a) shows the relation between the DC high voltage at a high level and a low level and a motor-induced voltage, FIG. 11(b) shows a carrier signal and a duty signal in inverter control, FIG. 11(c) shows the target current and the actual current of a motor, and FIG. 11(d) shows the DC high voltage and a sampling timing request signal.

DESCRIPTION OF EMBODIMENTS

Figure 1:
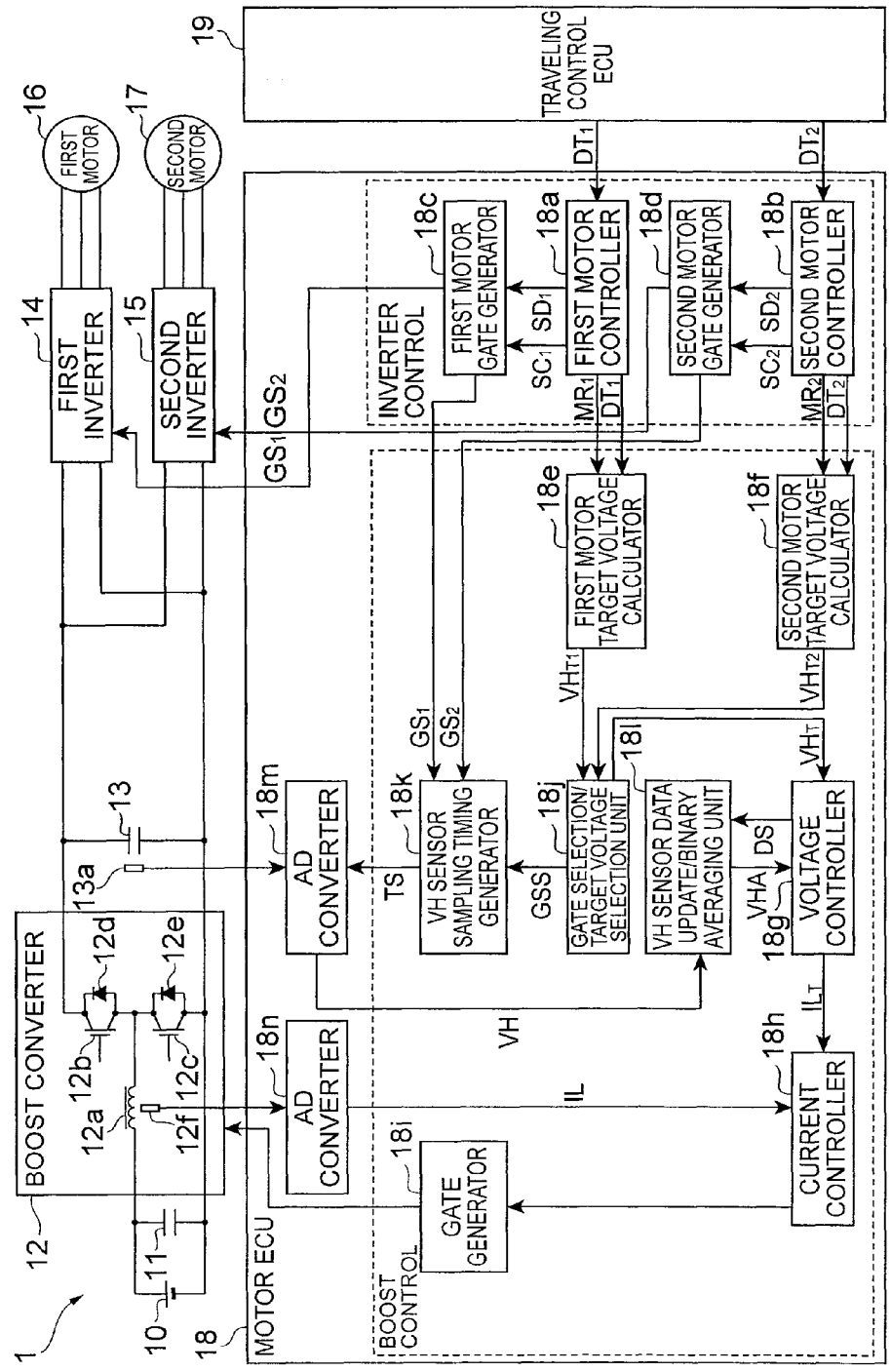
FIG. 1 is a block diagram illustrating the structure of a two-motor system according to a first embodiment.

Hereinafter, motor voltage conversion control devices according to exemplary embodiments of the invention will be described with reference to the accompanying drawings. In the drawings, the same or equivalent components are denoted by the same reference numerals and a description thereof will not be repeated.

In the embodiments, a motor voltage conversion control device according to the invention is applied to a boost control function of a motor ECU [Electronic Control Unit] of a vehicle (for example, a hybrid vehicle, an electric vehicle, or a fuel cell vehicle) including a two-motor system having two motors. In the two-motor system according to this embodiment, a boost converter converts a DC voltage of a battery into a DC high voltage required to drive a motor. An inverter of each motor which is supplied with the DC high voltage converts DC power into three-phase AC power for each motor and each motor is driven by the three-phase AC power. In this embodiment, there are three different embodiments of a method of setting the sampling timing of a boosted DC high voltage. A first embodiment is a base and functions are added to the first embodiment to implement second and third embodiments.

Figure 2:
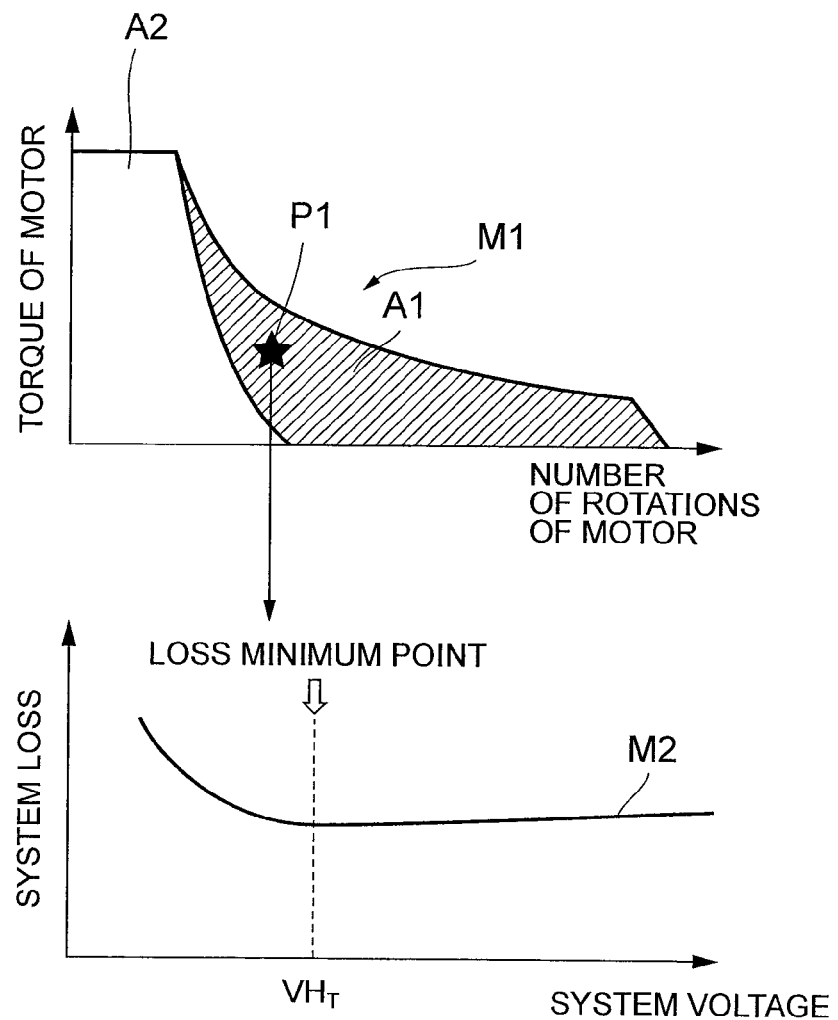
FIG. 2 is a diagram illustrating a method of calculating a target voltage of each motor.
Figure 4:
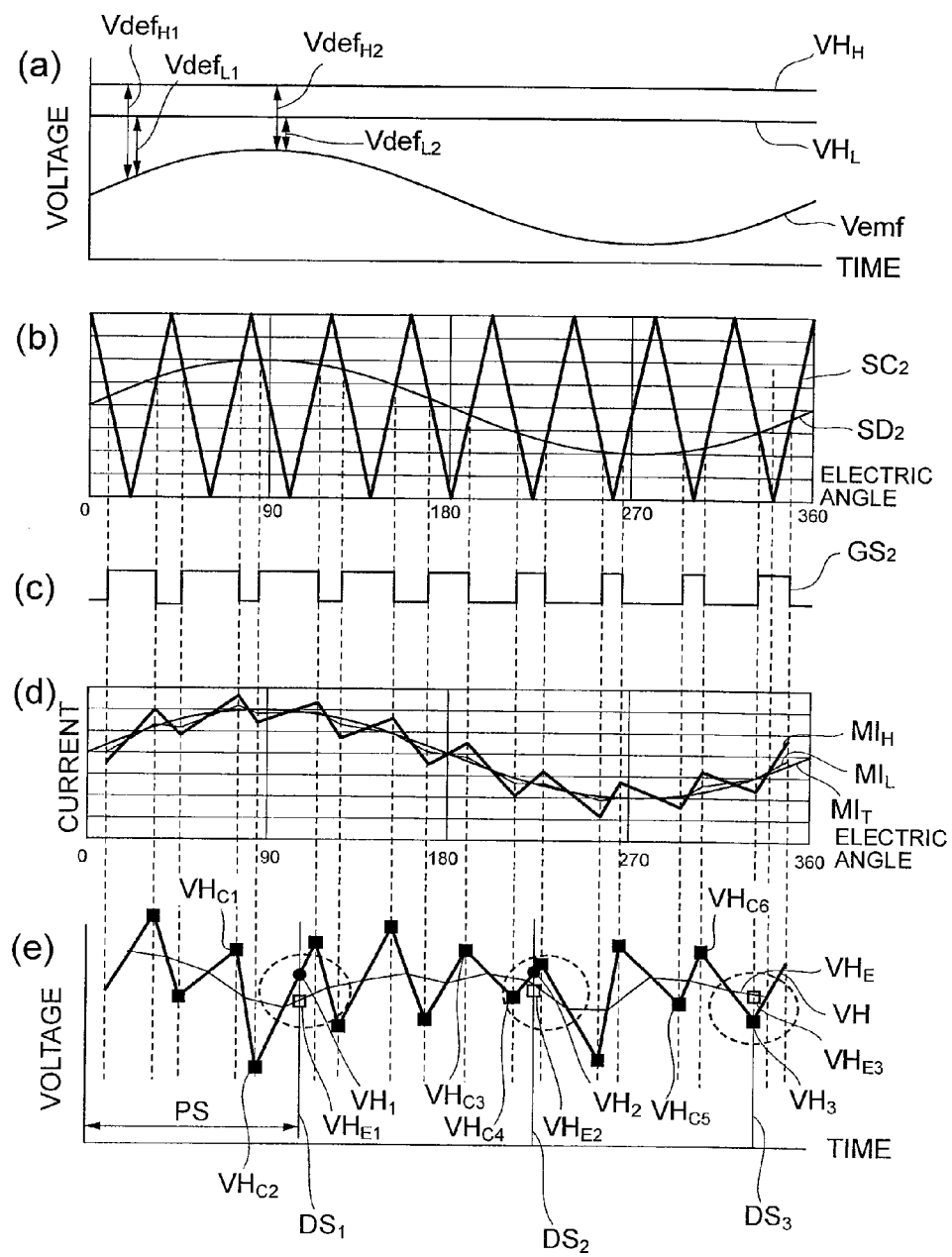
FIG. 4 is a diagram illustrating the sampling timing of a DC high voltage according to the first embodiment.

A two-motor system 1 according to a first embodiment will be described with reference to FIGS. 1 to 4. FIG. 1 is a block diagram illustrating the structure of the two-motor system according to the first embodiment. FIG. 2 is a diagram illustrating a method of calculating a target voltage of each motor. FIG. 3 is a diagram illustrating a method of determining the target voltage in the two-motor system. Specifically, FIG. 3(a) shows the flow of the determining method and FIG. 3(b) shows an example of a map of the system voltage and system loss of two motors. FIG. 4 is a diagram illustrating the sampling timing of the DC high voltage according to the first embodiment. Specifically, FIG. 4(a) is a diagram illustrating the relation between a motor-induced voltage and the DC high voltage at a high level and a low level, FIG. 4(b) shows a carrier signal and a duty signal in inverter control, FIG. 4(c) shows a gate signal in the inverter control, FIG. 4(d) shows the target current and the actual current of the motor, and FIG. 4(e) shows the DC high voltage and a sampling timing request signal.

The two-motor system 1 includes a battery 10, a filter capacitor 11, a boost converter 12, a smoothing capacitor 13, a first inverter 14, a second inverter 15, a first motor 16, a second motor 17, and a motor ECU 18. In this embodiment, the battery 10 corresponds to a power supply described in the claims, the boost converter 12 corresponds to a voltage conversion circuit described in the claims, the smoothing capacitor 13 corresponds to a capacitor described in the claims, the first inverter 14 and the second inverter 15 correspond to a motor control circuit described in the claims, and the first motor 16 and the second motor 17 correspond to a plurality of motors described in the claims.

The two-motor system 1 converts the DC power of the battery 10 into three-phase AC power for each of the motors 16 and 17 in response to motor torque commands $DT_1$ and $DT_2$ for the motors 16 and 17 transmitted from a traveling control ECU 19 and supplies the three-phase AC power to each of the motors 16 and 17. For the supply of power, the motor ECU 18 selects a target voltage $VH_T$ of the system from target voltages $VH_{T1}$ and $VH_{T2}$ required to drive the motors 16 and 17, and performs boost control on the boost converter 12 in order to boost a DC low voltage VL of the battery 10 to the target voltage $VH_T$ (DC high voltage VH) of the system. In addition, the motor ECU 18 performs inverter control on each of the inverters 14 and 15 in order to convert the DC power into three-phase AC power required to generate the motor torque commands $DT_1$ and $DT_2$ for the motors 16 and 17. In particular, in order to perform stable boost control even when the DC high voltage VH pulsates due to a motor current pulse caused by the influence of switching noise in the inverter control, the motor ECU 18 selects a gate signal for motor inverter control which has not been selected as the target voltage $VH_T$ of the system from gate signals $GS_1$ and $GS_2$ for performing inverter control on the motors 16 and 17, calculates the average value VHA of the DC high voltage (the voltage between both ends of the smoothing capacitor 13) at the continuous switching timing (continuous rising timing and falling timing) of the selected gate signal, performs sampling, and performs boost control using the average value VHA of the DC high voltage at the continuous rising timing and falling timing of the gate signal GS immediately before a VH sensor sampling timing request signal DS, in response to each VH sensor sampling timing request signal DS.

The traveling control ECU 19 is for controlling the traveling of the vehicle. The traveling control ECU 19 calculates a target motor torque required for the first motor 16 and a target motor torque required for the second motor on the basis of the traveling state of the vehicle in response to an acceleration request or a brake request from the driver or by automatic driving, and outputs the target motor torques as the motor torque commands $DT_1$ and $DT_2$ to the motor ECU 18.

The battery 10 serves as a DC power supply and is a secondary battery. The filter capacitor 11 is provided between the battery 10 and the boost converter 12 and is connected in parallel to the battery 10. The filter capacitor 11 smoothes the DC voltage of the battery 10 and stores the charge of the DC voltage. The voltage between both ends of the filter capacitor 11 is the DC low voltage VL. The filter capacitor 11 prevents a pulsating current caused by switching from flowing to the battery 10.

The boost converter 12 includes a reactor 12a, switching elements 12b and 12c, and free wheel diodes 12d and 12e. One end of the reactor 12a is connected to the high-voltage side of the filter capacitor 11. The other end of the reactor 12a is connected to a connection point between the switching element 12b and the switching element 12c. An IL sensor 12f detects a current IL (analog value) flowing to the reactor 12a and outputs the detected current IL to the motor ECU 18. The switching element 12b and the switching element 12c are connected in series to each other. The high-voltage side of the smoothing capacitor 13 is connected to a collector of the switching element 12b and the low-voltage side of the smoothing capacitor 13 is connected to an emitter of the switching element 12c. The free wheel diodes 12d and 12e are connected in parallel to the switching elements 12b and 12c, respectively. In this circuit structure, in the boost converter 12, switching control is performed on the switching elements 12b and 12c on the basis of the gate signals for the switching elements 12b and 12c which are output from the motor ECU 18 to convert the DC low voltage VL of the filter capacitor 11 into the DC high voltage VH.

The smoothing capacitor 13 is provided between the boost converter 12 and the first and second inverters 14 and 15. The smoothing capacitor 13 smoothes the DC voltage boosted by the boost converter 12 and stores the charge of the DC voltage. The voltage between both ends of the smoothing capacitor 13 is the DC high voltage VH. A VH sensor 13a detects the voltage (analog value) VH between both ends of the smoothing capacitor 13 and outputs the detected voltage to the motor ECU 18.

The first inverter 14 converts DC power into three-phase AC power in order to drive the first motor 16 in the two-motor system. The second inverter 15 converts DC power into three-phase AC power in order to drive the second motor 17 in the two-motor system. The first inverter 14 and the second inverter 15 have the same circuit structure and are the general inverter circuits according to the related art that convert DC power into three-phase AC power. Therefore, the detailed circuit structure thereof will not be described. The first inverter 14 is supplied with the DC high voltage VH of the smoothing capacitor 13, performs switching control on a switching element of each phase on the basis of each gate signal $GS_1$ for the switching element corresponding to each phase (a U phase, a V phase, and a W phase) of the first motor 16 output from the motor ECU 18 to convert DC power into three-phase AC power, and supplies the three-phase AC power to the first motor 16. Similarly, the second inverter 15 converts DC power into three-phase AC power on the basis of each gate signal $GS_2$ corresponding to each phase of the second motor 17 output from the motor ECU 18 and supplies the three-phase AC power to the second motor 17.

The first motor 16 and the second motor 17 are AC motors and are the driving source of the vehicle. The three-phase AC power is supplied from the first inverter 14 to the coils (not shown) of each phase in the first motor 16 and the first motor 16 is rotated. The three-phase AC power is supplied from the second inverter 15 to the coils (not shown) of each phase in the second motor 17 and the second motor 17 is rotated. One of the two motors may be a generator or a motor generator, or both the two motors may be motor generators.

The motor ECU 18 is an electronic control unit including, for example, a microcomputer and various kinds of memories and performs motor control. In particular, the motor ECU 18 has an inverter control function (a first motor controller 18a, a second motor controller 18b, a first motor gate generator 18c, and a second motor gate generator 18d) for controlling the inverters 14 and 15 and a boost control function (a first motor target voltage calculator 18e, a second motor target voltage calculator 18f, a voltage controller 18g, a current controller 18h, a gate generator 18i, a gate selection/target voltage selection unit 18j, a VH sensor sampling timing generator 18k, and a VH sensor data update/binary averaging unit 18l) for controlling the boost converter 12. The inverter control function and the boost control function may be implemented by the same microcomputer or different microcomputers. In the first embodiment, the first motor target voltage calculator 18e and the second motor target voltage calculator 18f correspond to target voltage setting unit described in the claims, the gate selection/target voltage selection unit 18j corresponds to selection unit described in the claims, the VH sensor sampling timing generator 18k corresponds to sampling timing generating unit described in the claims, the voltage controller 18g corresponds to control unit described in the claims, and the VH sensor 13a, an AD converter 18m and the VH sensor data update/binary averaging unit 18l correspond to sampling unit described in the claims.

Next, the inverter control function will be described. In the inverter control function, the first motor controller 18a and the first motor gate generator 18c perform inverter control on the first inverter 14 (furthermore, the first motor 16), and the second motor controller 18b and the second motor gate generator 18d perform inverter control on the second inverter 15 (furthermore, the second motor 17).

The first motor controller 18a receives the first motor torque command $DT_1$ for the first motor 16 from the traveling control ECU 19, generates a first carrier signal $SC_1$ and a first duty signal $SD_1$ for generating motor torque indicated by the first motor torque command $DT_1$ using the motor angle and motor current of the first motor 16 respectively detected by an angle sensor and a current sensor, and outputs the generated signals to the first motor gate generator 18c. The first motor controller 18a outputs a first motor rotation speed $MR_1$ of the first motor 16 and the first motor torque command $DT_1$ to the first motor target voltage calculator 18e in the boost control function.

The second motor controller 18b receives the second motor torque command $DT_2$ for the second motor 17 from the traveling control ECU 19, generates a second carrier signal $SC_2$ and a second duty signal $SD_2$ for generating motor torque indicated by the second motor torque command $DT_2$ using the motor angle and motor current of the second motor 17 respectively detected by the angle sensor and the current sensor, and outputs the generated signals to the second motor gate generator 18d. The second motor controller 18b outputs a second motor rotation speed $MR_2$ of the second motor 17 and the second motor torque command $DT_2$ to the second motor target voltage calculator 18f in the boost control function.

The first motor gate generator 18c receives the first carrier signal $SC_1$ and the first duty signal $SD_1$ from the first motor controller 18a, generates the gate signal $GS_1$ (for example, a PWM signal) of the switching element of each phase in the first inverter 14 on the basis of the first carrier signal $SC_1$ and the first duty signal $SD_1$, and outputs the generated signal to the first inverter 14. The first motor gate generator 18c outputs the first gate signal $GS_1$ to the VH sensor sampling timing generator 18k in the boost control function.

The second motor gate generator 18d receives the second carrier signal $SC_2$ and the second duty signal $SD_2$ from the second motor controller 18b, generates the gate signal $GS_2$ of the switching element of each phase in the second inverter 15 on the basis of the second carrier signal $SC_2$ and the second duty signal $SD_2$, and outputs the generated signal to the second inverter 15. In addition, the second motor gate generator 18d outputs the second gate signal $GS_2$ to the VH sensor sampling timing generator 18k in the boost control function. FIG. 4(b) shows an example of the second carrier signal $SC_2$ and the second duty signal $SD_2$ for performing inverter control on the second motor 17. The gate signal $GS_2$ for turning on or off the switching element of the second inverter 15 is generated at the timing when the second carrier signal $SC_2$ and the second duty signal $SD_2$ intersect each other. FIG. 4(c) shows the gate signal $GS_2$.

The carrier signal SC is a carrier frequency and is the switching frequency of the switching elements in the inverters 14 and 15. As shown in FIG. 4(b), the carrier signal SC is, for example, a triangular wave having the peak and trough as vertices. In order to rotate the motors 16 and 17 at a high speed with high torque, it is necessary to increase the carrier frequency. However, when system loss occurs due to, for example, an increase in the temperature of the switching elements of the inverters 14 and 15, it is necessary to reduce the carrier frequency. The duty signal SD is for determining the duty ratio between the on and off times of the switching elements in the inverters 14 and 15. As shown in FIG. 4(b), the duty signal SD is, for example, a sine wave. The gate signal GS is for turning on or off the switching elements in the inverters 14 and 15. As shown in FIG. 4(c), the gate signal GS is, for example, a PWM signal.

The switching elements in the inverters 14 and 15 are switched at the ON/OFF switching timings of the gate signals $GS_1$ and $GS_2$ and a pulse component is superimposed on the motor current by the influence of the switching. FIG. 4(d) shows a target current $MI_T$ of the second motor 17 generated from the second gate signal $GS_2$ shown in FIG. 4(c), the actual current $MI_H$ of the second motor 17 on which a large pulse component is superimposed, and the actual current $MI_L$ of the second motor 17 on which a small pulse component is superimposed. As can be seen from FIG. 4(d), the actual currents $MI_H$ and $MI_L$ of the second motor 17 have the peak and trough at the rising timing and the falling timing of the gate signal $GS_2$, which are change points at which increase and decrease in the magnitude of the pulse component are changed.

Next, the boost control function will be described. The first motor target voltage calculator 18e receives the first motor rotation speed $MR_1$ and the first motor torque command $DT_1$ from the first motor controller 18a in the inverter control function, calculates the first target voltage $VH_{T1}$ of the first motor 16 on the basis of the first motor rotation speed $MR_1$ and the first motor torque command $DT_1$, and outputs the first target voltage $VH_{T1}$ to the gate selection/target voltage selection unit 18j. The second motor target voltage calculator 18f receives the second motor rotation speed $MR_2$ and the second motor torque command $DT_2$ from the second motor controller 18b in the inverter control function, calculates the second target voltage $VH_{T2}$ of the second motor 17 on the basis of the second motor rotation speed $MR_2$ and the second motor torque command $DT_2$, and outputs the second target voltage $VH_{T2}$ to the gate selection/target voltage selection unit 18j.

The first motor target voltage calculator 18e and the second motor target voltage calculator 18f calculate the target voltage using the same process and the process will be described below. As shown in FIG. 2, first, an intersection point P1 between the motor rotation speeds $MR_1$ and $MR_2$ and the motor torque corresponding to the motor torque commands $DT_1$ and $DT_2$ is extracted from a map M1 of the motor rotation speed and the motor torque. The map M1 includes a weak magnetic field control region A1 (a hatched region) and a PWM control region A2 and the range of the control region varies depending on the level of the system voltage (DC high voltage VH) of the two-motor system 1. In the example shown in FIG. 2, since the intersection point P1 is within the weak magnetic field control region A1, weak magnetic field control is performed. In addition, as shown in FIG. 2, the target voltage $VH_T$ at which the system loss is the minimum is calculated from a map M2 of the system voltage and the system loss which varies depending on the intersection point P1.

The system loss occurs due to, for example, the switching elements in the two-motor system 1. As the system voltage increases, it is easier for the motors 16 and 17 to rotate, but the system loss increases. As described above, the method using the map is used in order to calculate the boost control target voltage. However, other methods may be used.

As shown in FIG. 4(e), the voltage controller 18g outputs the VH sensor sampling timing request signal DS to the VH sensor data update/binary averaging unit 18l for each sampling timing period PS and receives the average value VHA of the DC high voltage VH (digital value) sampled to be used for boost control which is transmitted from the VH sensor data update/binary averaging unit 18l in response to the VH sensor sampling timing request signal DS. The sampling timing period PS may be a predetermined fixed value or a variable value. Since the sampling timing period PS is set regardless of inverter control, the VH sensor sampling timing request signal DS is not synchronized with the gate signal GS of inverter control. The voltage controller 18g receives the target voltage $VH_T$ of the system from the gate selection/target voltage selection unit 18j and performs control such that the voltage (DC high voltage) between both ends of the smoothing capacitor 13 becomes the target voltage $VH_T$, using the average value VHA of the DC high voltage VH (digital value) from the VH sensor data update/binary averaging unit 18l. In this case, the voltage controller 18g calculates a target current $IL_T$ required for the control and outputs the target current $IL_T$ to the current controller 18h.

The current controller 18h receives the target current $IL_T$ from the voltage controller 18g and performs control such that the current flowing to the reactor 12a becomes the target current $IL_T$, using the current IL (digital value) flowing to the reactor 12a. The current (digital value) obtained by performing AD conversion on the current (analog value) detected by the IL sensor 12f using an AD converter 18n in the motor ECU 18 is used as the current IL (digital value) used for control.

The gate generator 18i generates each of the gate signals (for example, PWM signals) of the switching elements 12b and 12c in the boost converter 12 on the basis of the control operation of the voltage controller 18g for obtaining the target voltage $VH_T$ and the control operation of the current controller 18h for obtaining the target current $IL_T$ and outputs the gate signals to the boost converter 12.

The gate selection/target voltage selection unit 18j receives the first target voltage $VH_{T1}$ from the first motor target voltage calculator 18e and also receives the second target voltage $VH_{T2}$ from the second motor target voltage calculator 18f. As shown in FIG. 3, the first motor target voltage calculator 18e calculates the first target voltage $VH_{T1}$ at which the system loss of the first motor 16 is the minimum from a map M2a corresponding to the intersection point between the first motor rotation speed $MR_1$ and the motor torque corresponding to the first motor torque command $DT_1$. The second motor target voltage calculator 18f calculates the second target voltage $VH_{T2}$ at which the system loss of the second motor 17 is the minimum from a map M2b corresponding to the intersection point between the second motor rotation speed $MR_2$ and the motor torque corresponding to the second motor torque command $DT_2$. As can be seen from the example shown in FIG. 3, the first target voltage $VH_{T1}$ and the second target voltage $VH_{T2}$ are separately calculated from the motor rotation speeds and the motor torque commands of the motors 16 and 17 and are generally different from each other. Therefore, it is necessary to select the target voltage of the two-motor system 1 from the two voltages, that is, the first target voltage $VH_{T1}$ and the second target voltage $VH_{T2}$, and the maximum value (a higher voltage) of the first target voltage $VH_{T1}$ and the second target voltage $VH_{T2}$ is used as the command value of the target voltage of the two-motor system 1 such that the optimal efficiency of the system is obtained, as shown in FIG. 3(a). The gate selection/target voltage selection unit 18j selects the higher one of the first target voltage $VH_{T1}$ and the second target voltage $VH_{T2}$ as the target voltage $VH_T$ of the two-motor system 1 whenever the first target voltage $VH_{T1}$ and the second target voltage $VH_{T2}$ are input. Then, the gate selection/target voltage selection unit 18j outputs the selected target voltage $VH_T$ to the voltage controller 18g. In addition, the gate selection/target voltage selection unit 18j outputs a gate selection signal GSS for selecting the gate signal of the motor with the target voltage which has not been selected as the target voltage $VH_T$ of the two-motor system 1 to the VH sensor sampling timing generator 18k. The gate selection signal GSS indicates, for example, one of the first motor 16 and the second motor 17 (the motor with a target voltage which has not been selected as the target voltage $VH_T$ of the two-motor system 1).

The VH sensor sampling timing generator 18k receives the first gate signal $GS_1$ from the first motor gate generator 18c and the second gate signal $GS_2$ from the second motor gate generator 18d in the inverter control function and also receives the gate selection signal $GS_S$ from the gate selection/target voltage selection unit 18j. Then, the VH sensor sampling timing generator 18k selects, as a gate signal $GS_S$ used to generate a VH sensor sampling timing TS, the gate signal of the motor with the target voltage which has not been selected as the target voltage $VH_T$ of the two-motor system 1 from the first gate signal $GS_1$ and the second gate signal $GS_2$ on the basis of the gate selection signal GSS. In addition, the VH sensor sampling timing generator 18k outputs the timing (falling timing) when the selected gate signal $GS_S$ is changed from an on state to an off state and the timing (rising timing) when the selected gate signal $GS_S$ is changed from an off state to an on state as the VH sensor sampling timing TS (AD conversion start signal) to the AD converter 18m. The AD converter 18m performs AD conversion on the DC high voltage (analog value) VH detected by the VH sensor 13a whenever the VH sensor sampling timing TS is input from the VH sensor sampling timing generator 18k and outputs the AD-converted DC high voltage (digital value) VH to the VH sensor data update/binary averaging unit 18l. The gate signal of any one of three phases, that is, a U phase, a V phase, and a W phase may be used as the gate signals from the first and second motor gate generators 18c and 18d.

The VH sensor data update/binary averaging unit 18l stores the DC high voltage (digital value) VH in time series whenever the DC high voltage (digital value) VH is input from the AD converter 18m. In addition, the VH sensor data update/binary averaging unit 18l calculates the average value VHA between the currently input DC high voltage (digital value) VH and the previously input DC high voltage (digital value) VH which is stored in time series and stores the average value VHA between the currently input DC high voltage and the previously input DC high voltage in time series. In addition, only the latest average value VHA may be stored. Then, whenever the VH sensor sampling timing request signal DS is input from the voltage controller 18g, the VH sensor data update/binary averaging unit 18l outputs the average value VHA of the DC high voltages calculated immediately before the VH sensor sampling timing request signal DS as a VH sensor value used for boost control to the voltage controller 18g.

Next, the reason why boost control can be stably performed due to above boost control function even when the DC high voltage VH pulsates due to the pulsation of the motor current occurring by the influence of switching in the inverter control function will be described with reference to FIG. 4. FIG. 4 shows an example in which the motor with the target voltage which has not been selected as the target voltage $VH_T$ of the two-motor system 1 is the second motor 17.

When the carrier frequency is reduced in the inverter control in order to prevent system loss, a pulse component is superimposed on the voltage (boosted DC high voltage) between both ends of the smoothing capacitor by switching noise in the inverter control. In addition, the target voltage required to drive the motor varies depending on the number of rotations or torque of the motor. As the target voltage increases and the DC high voltage VH is higher than the motor-induced voltage Vemf, a voltage difference Vdef increases and the pulse components in the DC high voltage increases.

FIG. 4(a) shows the relations among the motor-induced voltage Vemf, the voltage $VH_H$ when the DC high voltage VH is high, and the voltage $VH_L$ when the DC high voltage VH is low. When voltage differences $Vdef_{H1}$ and $Vdef_{H2}$ between the high level of the DC high voltage $VH_H$ and the motor-induced voltage Vemf are compared with voltage differences $Vdef_{L1}$ and $Vdef_{L2}$ between the low level of the DC high voltage $VH_L$ and the motor-induced voltage Vemf, the voltage difference Vdef when the DC high voltage $VH_H$ is high is more than that when the DC high voltage $VH_H$ is low. As the voltage difference Vdef increases, the pulse components superimposed on the motor current increases. In particular, in the case of the two-motor system 1, the higher one of the first target voltage $VH_{T1}$ and the second target voltage $VH_{T2}$ of the motors 16 and 17 is selected as the target voltage $VH_T$ of the two-motor system 1 and the DC high voltage VH is controlled such that the target voltage $VH_T$ is obtained. Therefore, for the motor with the target voltage which has not been selected as the target voltage $VH_T$ of the two-motor system 1, the motor-induced voltage Vemf is lower than the DC high voltage VH and the voltage difference Vdef between the DC high voltage VH and the motor-induced voltage Vemf increases.

FIG. 4(d) shows the target current $MI_T$ of the second motor 17, the actual current $MI_H$ of the second motor 17 in the case of the large voltage difference $Vdef_H$, and the actual current $MI_L$ of the second motor 17 in the case of the small voltage difference $Vdef_L$. Pulse components are superimposed on the actual currents $MI_H$ and $MI_L$ of the second motor 17 due to switching between the switching elements of the second inverter 15 and increase and decrease in the pulse components are switched at the rising timing and the falling timing (the intersection point between the second carrier signal $SC_2$ and the second duty signal $SD_2$ shown in FIG. 4(b)) of the gate signal $GS_2$ shown in FIG. 4(c). As can be seen from FIG. 4(d), as the voltage difference Vdef increases, the pulse components superimposed on the motor current MI increases. In particular, as described above, in the case of the two-motor system 1, since the voltage difference Vdef of the motor with the target voltage which has not been selected as the target voltage $VH_F$ of the two-motor system 1 is large, the pulse components superimposed on the actual current MI of the motor with the target voltage which has not been selected as the target voltage $VH_T$ of the two-motor system 1 is large.

FIG. 4(e) shows the DC high voltage VH at the motor current $MI_H$ in the case of the large voltage difference $Vdef_H$. A pulse component is superimposed on the DC high voltage VH according to the pulse component of the motor current $MI_H$ and increase and decrease in the pulse components are changed at the rising timing and the falling timing of the gate signal $GS_2$ shown in FIG. 4(c). As such, when the motor current pulsates by the influence of switching in the inverter (in particular, the inverter of the motor with the target voltage which has not been selected as the target voltage $VH_T$ of the two-motor system 1), a pulse component is superimposed on the boosted DC high voltage. In addition, switching in the inverter of the motor with the target voltage which has been selected as the target voltage $VH_T$ of the two-motor system 1 affects the pulsation (furthermore, the pulsation of the boosted DC high voltage) of the motor current. However, the influence of the switching on the pulsation of the motor current is significantly less than that of switching in the inverter of the motor with the target voltage which has not been selected as the target voltage $VH_T$ of the two-motor system 1 on the pulsation of the motor current.

That is, the pulse components (variation) superimposed on the motor current MI by switching in the inverter control is determined by the voltage difference Vdef between the DC high voltage VH and the motor-induced voltage Vemf and the carrier frequency (carrier signal SC(gate signal GS)) of the inverter control. Therefore, when the voltage difference Vdef is large and the inverter frequency is reduced, the pulse components superimposed on the motor current MI increases. In particular, the pulse component is affected by switching in the inverter control of the motor with the target voltage which has not been selected as the target voltage $VH_T$ of the two-motor system 1. When the capacitance of the smoothing capacitor 13 is small and the pulse components superimposed on the motor current MI increases, the smoothing capability of the smoothing capacitor 13 is insufficient and the pulse component is also superimposed on the voltage (DC high voltage) VH between both ends of the smoothing capacitor 13. As a result, a large variation occurs in the boosted DC high voltage VH. In addition, in order to reduce the cost and size of the two-motor system 1, it is necessary to minimize the capacitance of the smoothing capacitor 13. Therefore, when the capacitance of the smoothing capacitor 13 is reduced in order to meet the requirements, the DC high voltage VH pulsates, as described above.

As described above, the increase and decrease in the pulse components occurring due to switching in the inverter control are changed at the rising timing and the falling timing of the gate signal. Therefore, as can be seen from FIGS. 4(c) and 4(d), since the rising timing and the falling timing of the gate signal $GS_2$ are the peak and trough of the motor current MI on which the pulse component is superimposed, an intermediate value between the peak and trough of the motor current MI is obtained at an intermediate timing between the continuous rising timing and falling timing of the gate signal $GS_2$. Therefore, as can be seen from FIGS. 4(c) and 4(e), an intermediate value (that is, the expected value $VH_E$ of the DC high voltage for stably performing boost control) between the peak and trough of the DC high voltage VH on which the pulse component is superimposed is also obtained at the intermediate time between the continuous rising timing and falling timing of the gate signal $GS_2$. As can be seen from FIG. 4(e), the average value of the DC high voltages VH at the continuous rising timing and falling timing of the gate signal $GS_2$ is substantially equal to the expected value $VH_E$ of the DC high voltage. The expected value $VH_E$ of the DC high voltage is the intermediate value between the peak and trough of the DC high voltage VH and is the DC high voltage from the pulse component is substantially removed.

In the boost control function of the motor ECU 18, the VH sensor sampling timing generator 18k generates the VH sensor sampling timing TS at each of the ON/OFF switching timings of the gate signal GS of the motor with the target value which has not been selected as the target voltage $VH_T$ of the two-motor system 1 which is largely affected by the pulsation of the motor current, and the AD converter 18m performs AD conversion on the DC high voltage (analog value) VH detected by the VH sensor 13a at each VH sensor sampling timing TS to obtain the DC high voltage (digital value) VH.

As can be seen from FIG. 4(e), when the expected values $VH_{E1}$, $VH_{E2}$, and $VH_{E3}$ of the DC high voltage at the timings of the VH sensor sampling timing request signals $DS_1$, $DS_2$, and $DS_3$ are compared with the average value between a DC high voltage $VH_{C1}$ and a DC high voltage $VH_{C2}$, the average value between a DC high voltage $VH_{C3}$ and a DC high voltage $VH_{C4}$, and the average value between a DC high voltage $VH_{C5}$ and a DC high voltage $VH_{C6}$ at the rising timing and the falling timing of the gate signal $GS_2$ immediately before the VH sensor sampling timing request signals $DS_1$, $DS_2$, and $DS_3$, the difference is very small. Therefore, since the average value VHA of the DC high voltage VH (VH sensor value) at the continuous rising timing and falling timing of the gate signal $GS_2$ immediately before the VH sensor sampling timing request signal DS is obtained, it is possible to obtain a value closest to the expected value $VH_E$ of the DC high voltage at the timing of the VH sensor sampling timing request signal DS.

In the boost control function of the motor ECU 18, the VH sensor data update/binary averaging unit 18l calculates the average value VHA between the DC high voltage (digital value) VH at the ON/OFF switching timing of the gate signal GS input from the AD converter 18m immediately before the VH sensor sampling timing request signal DS and the DC high voltage (digital value) VH at the ON/OFF timing of the previously input gate signal GS whenever the VH sensor sampling timing request signal DS is input from the voltage controller 18g and outputs the average value VHA to the voltage controller 18g. The voltage controller 18g performs boost control using the average value VHA of the DC high voltage (digital value) VH at the continuous ON/OFF switching timing of the gate signal GS immediately before the VH sensor sampling timing request signal DS. In this way, the voltage controller 18g can perform control using the average value VHA of the DC high voltage close to the expected value $VH_E$ of the DC high voltage in the case of the VH sensor sampling timing request signal DS.

The two-motor system 1 (in particular, boost control by the motor ECU 18) according to this embodiment samples the DC high voltage VH (the average value VHA) used for boost control on the basis of the gate signal in the inverter control of the motor with the target voltage which has not been selected as the target voltage $VH_T$ of the two-motor system 1 (operatively associates inverter control with boost control). Therefore, even when a pulse component is superimposed on the DC high voltage VH, it is possible to sample the DC high voltage VH (the average value VHA) close to the expected value $VH_E$ of the DC high voltage in the case of the VH sensor sampling timing request signal DS and the difference between the expected value $VH_E$ of the DC high voltage in the case of the VH sensor sampling timing request signal DS and the VH sensor value which is actually used in boost control is reduced, which makes it possible to perform stable boost control. In this way, it is possible to reduce the capacitance of the smoothing capacitor 13 to the lower limit and thus reduce the cost and size of the two-motor system 1.

In particular, the two-motor system 1 according to the first embodiment selects the gate signal for the inverter control of the motor with the target voltage which has not been selected as the target voltage $VH_T$ of the two-motor system 1, samples the average value VHA of the DC high voltage VH at the continuous rising timing and falling timing (ON/OFF switching timing) of the selected gate signal, and uses the average value VHA of the DC high voltage VH at the continuous rising timing and falling timing of the gate signal GS sampled immediately before the VH sensor sampling timing request signal DS for boost control. In this way, it is possible to perform boost control using the sensor value of the DC high voltage VH close to the expected value $VH_E$ of the DC high voltage in the case of the VH sensor sampling timing request signal DS and thus perform stable boost control.

Figure 5:
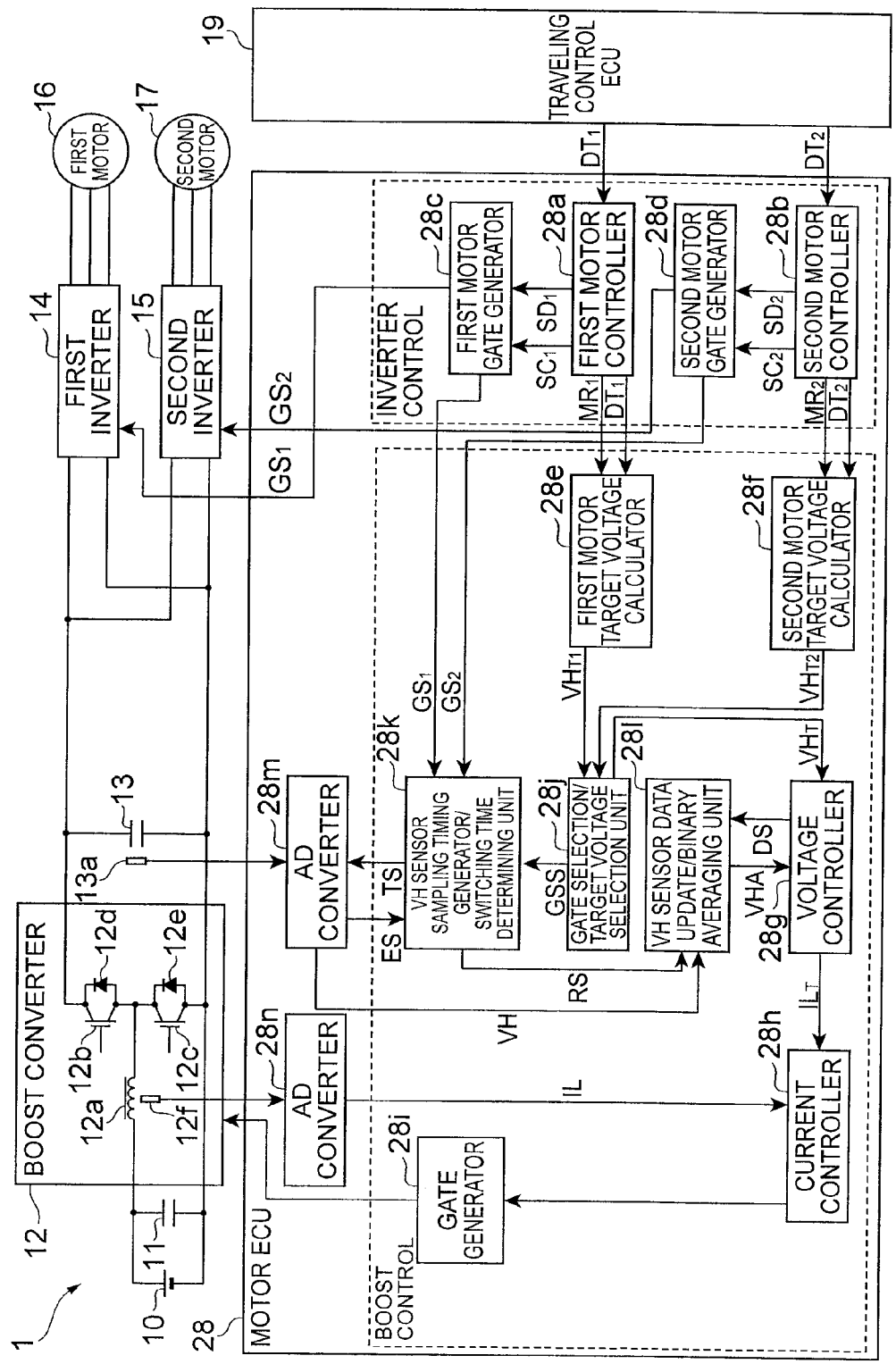
FIG. 5 is a block diagram illustrating the structure of a two-motor system according to a second embodiment.
Figure 6:
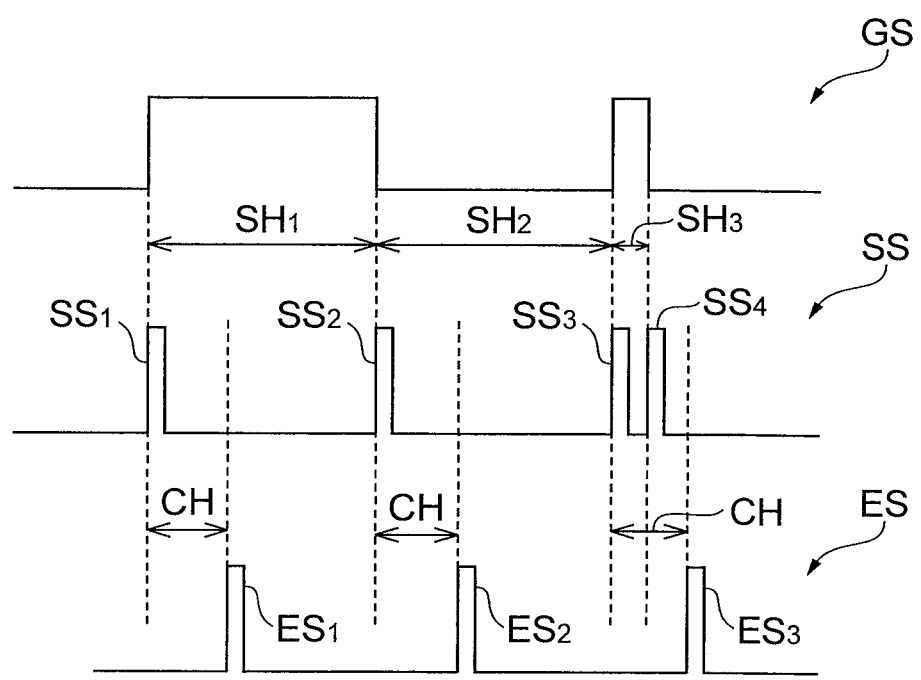
FIG. 6 is a diagram illustrating the relation among AD conversion time and the switching time of a gate signal.
Figure 7:
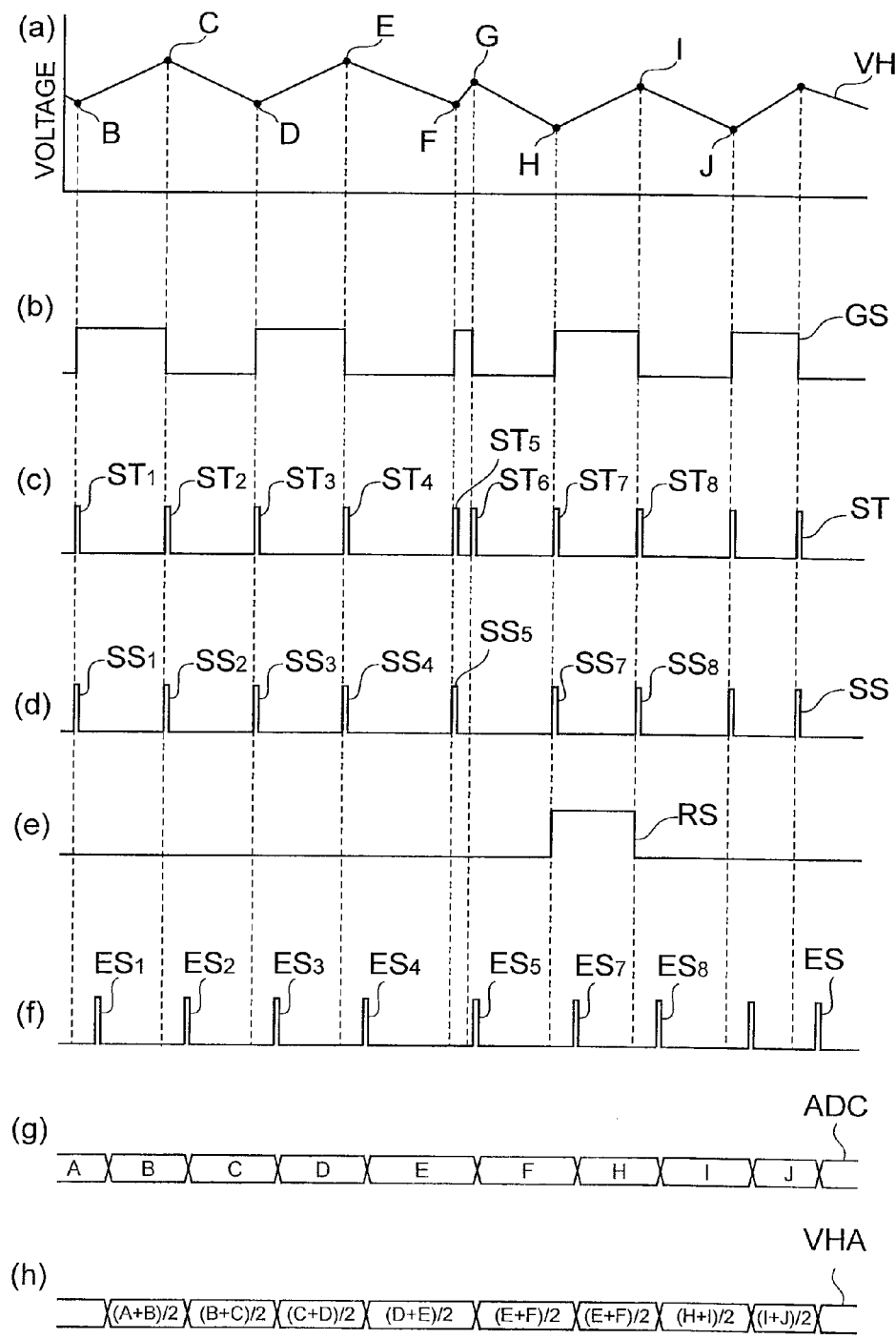
FIG. 7 is a diagram illustrating the sampling timing of a DC high voltage according to the second embodiment.

Next, a two-motor system 2 according to a second embodiment will be described with reference to FIGS. 5 to 7. FIG. 5 is a block diagram illustrating the structure of the two-motor system according to the second embodiment. FIG. 6 is a diagram illustrating the relation between an AD conversion time and the switching time of a gate signal. FIG. 7 is a diagram illustrating the sampling timing of a DC high voltage according to the second embodiment. Specifically, FIG. 7(a) shows the DC high voltage, FIG. 7(b) shows a gate signal in inverter control, FIG. 7(c) shows the switching timing of the gate signal FIG. 7(d) shows an AD conversion start signal input to an AD converter, FIG. 7(e) shows an averaging inhibition signal, FIG. 7(f) shows an AD conversion end signal from the AD converter, FIG. 7(g) shows the AD-converted value of the AD converter, and FIG. 7(h) shows a binary average value.

The two-motor system 2 includes a battery 10, a filter capacitor 11, a boost converter 12, a smoothing capacitor 13, a first inverter 14, a second inverter 15, a first motor 16, a second motor 17, and a motor ECU 28. The two-motor system 2 differs from the two-motor system 1 according to the first embodiment in the control of the motor ECU 28. When the AD conversion time is shorter than the ON/OFF switching time of the gate signal GS, the motor ECU 28 stops AD conversion and uses a previous value as the average value VHA of the DC high voltage in boost control. In this embodiment, only the motor ECU 28 will be described in detail.

Next, the relation between the AD conversion time and the ON/OFF switching time (the ON time and the OFF time) of the gate signal GS will be described with reference to FIG. 6. FIG. 6 shows an example of the gate signal GS, the AD conversion start signal SS (VH sensor sampling timing TS) input to the AD converter, and the AD conversion end signal ES from the AD converter. An AD conversion time CH is determined by the AD converter and is constant. In the case in which the switching times $SH_1$ and $SH_2$ of the gate signal GS are a little long, even when AD conversion start signals $SS_1$ and $SS_2$ are output at the ON/OFF switching timing of the gate signal GS, AD conversion ends within the switching times $SH_1$ and $SH_2$ and AD conversion end signals $ES_1$ and $ES_2$ are output from the AD converter until the next ON/OFF switching timing of the gate signal GS. On the other hand, in the case in which the switching time $SH_3$ of the gate signal GS is short, even when an AD conversion start signal $SS_3$ is output at the ON/OFF switching timing of the gate signal GS, the AD conversion does not end until the next ON/OFF switching timing of the gate signal GS and an AD conversion start signal $SS_4$ is output before an AD conversion end signal $ES_3$ is output from the AD converter. In this case, the AD converter cannot perform AD conversion on the AD conversion start signal $SS_4$. Therefore, the motor ECU 28 has additional functions capable of responding to this case.

The motor ECU 28 is an electronic control unit including, for example, a microcomputer and various kinds of memories and performs motor control. In particular, the motor ECU 28 has an inverter control function (a first motor controller 28a, a second motor controller 28b, a first motor gate generator 28c, and a second motor gate generator 28d) for controlling the inverters 14 and 15 and a boost control function (a first motor target voltage calculator 28e, a second motor target voltage calculator 28f, a voltage controller 28g, a current controller 28h, a gate generator 28i, a gate selection/target voltage selection unit 28j, a VH sensor sampling timing generator/switching time determining unit 28k, and a VH sensor data update/binary averaging unit 28l) for controlling the boost converter 12. The inverter control function and the boost control function may be implemented by the same microcomputer or different microcomputers. In the second embodiment, the first motor target voltage calculator 28e and the second motor target voltage calculator 28f correspond to target voltage setting unit described in the claims, The gate selection/target voltage selection unit 28j corresponds to selection unit described in the claims, the VH sensor sampling timing generator/switching time determining unit 28k corresponds to sampling timing generating unit described in the claims, and the voltage controller 28g corresponds to control unit described in the claims. The VH sensor 13a, the AD converter 28m, and the VH sensor data update/binary averaging unit 28l correspond to sampling unit described in the claims and the AD converter 28m corresponds to AD conversion unit described in the claims.

The first motor controller 28a, the second motor controller 28b, the first motor gate generator 28c, the second motor gate generator 28d, the first motor target voltage calculator 28e, the second motor target voltage calculator 28f, the voltage controller 28g, the current controller 28h, the gate generator 28i, the gate selection/target voltage selection unit 28j, and the AD converter 28n perform the same processes as the first motor controller 18a, the second motor controller 18b, the first motor gate generator 18c, the second motor gate generator 18d, the first motor target voltage calculator 18e, the second motor target voltage calculator 18f, the voltage controller 18g, the current controller 18h, the gate generator 18i, the gate selection/target voltage selection unit 18j, and the AD converter 18n according to the first embodiment and a description thereof will not be repeated.

The VH sensor sampling timing generator/switching time determining unit 28k receives a first gate signal $GS_1$ from the first motor gate generator 28c and a second gate signal $GS_2$ from the second motor gate generator 28d in the inverter control function, receives an AD conversion end signal ES from the AD converter 28m, and receives a gate selection signal GSS from the gate selection/target voltage selection unit 28j. Then, the VH sensor sampling timing generator/switching time determining unit 28k selects the gate signal of a motor with a target voltage which has not been selected as the target voltage $VH_T$ of the two-motor system 2 as a gate signal $GS_S$ used to generate a VH sensor sampling timing TS from the first gate signal $GS_1$ and the second gate signal $GS_2$ on the basis of the gate selection signal GSS. Then, when the next ON/OFF switching timing of the gate signal $GS_S$ comes after the AD conversion end signal ES, the VH sensor sampling timing generator/switching time determining unit 28k outputs the VH sensor sampling timing TS (AD conversion start signal) to the AD converter 28m at the next ON/OFF switching timing, on the basis of the AD conversion end signal ES for the VH sensor sampling timing TS (AD conversion start signal) and the next ON/OFF switching timing of the gate signal $GS_S$, each time the VH sensor sampling timing TS (AD conversion start signal) is output. When the next ON/OFF switching timing of the gate signal $GS_S$ comes before the AD conversion end signal ES, the VH sensor sampling timing generator/switching time determining unit 28k does not output the VH sensor sampling timing TS (AD conversion start signal) for the next ON/OFF switching timing to the AD converter 28m (the stop of AD conversion) and outputs an averaging inhibition signal RS to the VH sensor data update/binary averaging unit 28l. The ON timing of the averaging inhibition signal RS is the next switching timing of the gate signal $GS_S$ after the AD conversion is stopped and the OFF timing of the averaging inhibition signal RS is the next switching timing of the gate signal $GS_S$. Whenever the VH sensor sampling timing TS is input from the VH sensor sampling timing generator/switching time determining unit 28k, the AD converter 28m performs AD conversion on the DC high voltage (analog value) VH detected by the VH sensor 13a and outputs the AD-converted DC high voltage (digital value) VH to the VH sensor data update/binary averaging unit 28l. When the AD conversion ends, the AD converter 28m outputs the AD conversion end signal ES to the VH sensor sampling timing generator/switching time determining unit 28k. In particular, when the next ON/OFF switching timing of the gate signal $GS_S$ comes before the AD conversion end signal ES (when the switching time of the gate signal $GS_S$ is shorter than the AD conversion time), the AD converter 28m stops the AD conversion.

The VH sensor data update/binary averaging unit 28l stores the DC high voltage (digital value) VH in time series whenever the DC high voltage (digital value) VH is input from the AD converter 28m. In addition, the VH sensor data update/binary averaging unit 28l calculates the average value VHA between the currently input DC high voltage (digital value) VH and the previously input DC high voltage (digital value) VH which is stored in time series and stores the average value VHA between the currently input DC high voltage and the previously input DC high voltage in time series. In particular, when the averaging inhibition signal RS is input from the VH sensor sampling timing generator/switching time determining unit 28k, the VH sensor data update/binary averaging unit 28l inhibits the calculation of the average value VHA of the DC high voltages. In this case, the average value VHA of the previously calculated DC high voltage is stored as the latest value. Then, whenever the VH sensor sampling timing request signal DS is input from the voltage controller 28g, the VH sensor data update/binary averaging unit 28l outputs the average value VHA (the stored latest average value VHA) of the DC high voltage calculated immediately before the VH sensor sampling timing request signal DS as a VH sensor value used for boost control to the voltage controller 28g. Therefore, when the averaging inhibition signal RS is input, the average value VHA of the previously calculated DC high voltage is output.

Next, a process of calculating the average value VHA of the DC high voltage VH at the continuous ON/OFF switching timing of the gate signal GS when the switching time of the gate signal GS of the motor with the target voltage which has not been selected as the target voltage $VH_T$ is longer than the AD conversion time and when the switching time of the gate signal GS is shorter than the AD conversion time in the boost control function will be described with reference to FIG. 7. FIG. 7(a) shows the DC high voltage VH, FIG. 7(b) shows the gate signal GS, and FIG. 7(c) shows the ON/OFF switching timing ST of the gate signal GS. FIG. 7(a) shows a value B, a value C, a value D, . . . (the values of the peaks and troughs) as the DC high voltage values at switching timings $ST_1$, $ST_2$, $ST_3$, . . . . In addition, FIG. 7(d) shows AD conversion start signals $SS_1$, $SS_2$, $SS_3$, . . . (corresponding to the VH sensor sampling timing TS) output from the VH sensor sampling timing generator/switching time determining unit 28k at the switching timings $ST_1$, $ST_2$, $ST_3$, . . . . FIG. 7(f) shows AD conversion end signals $ES_1$, $ES_2$, $ES_3$, . . . output from the AD converter 28m when AD conversion which is performed in response to the AD conversion start signals $SS_1$, $SS_2$, $SS_3$, . . . ends. FIG. 7(g) shows a value A, a value B, a value C, a value D, (the values of the peaks and troughs of the DC high voltage VA), which are the AD-converted DC voltage values ADC which have been output from the AD converter 28m and then stored in the VH sensor data update/binary averaging unit 28l. FIG. 7(h) shows (A+B)/2, (B+C)/2, . . . , which are the average values VHA of the DC high voltage values which have been calculated by the VH sensor data update/binary averaging unit 28l and then stored.

For example, the switching timings $ST_1$ and $ST_2$ of the gate signal GS when the switching time of the gate signal GS is longer than the AD conversion time will be described below. The VH sensor sampling timing generator/switching time determining unit 28k outputs the AD conversion start signal $SS_1$ at the switching timing $ST_1$. The AD converter 28m starts AD conversion. When the AD conversion ends, the AD converter 28m outputs the value B as the DC high voltage (digital value) to the VH sensor data update/binary averaging unit 28l and outputs the AD conversion end signal $ES_1$ to the VH sensor sampling timing generator/switching time determining unit 28k. In this case, the VH sensor data update/binary averaging unit 28l stores the value B, calculates the average value (A+B)/2 using the previously stored value A and the current value B, and stores the average value (A+B)/2. Then, since the switching timing $ST_2$ comes after the AD conversion end signal $ES_1$, the VH sensor sampling timing generator/switching time determining unit 28k outputs the AD conversion start signal $SS_2$ at the switching timing $ST_2$ and the AD converter 28m starts the AD conversion. When the AD conversion ends, the AD converter 28m outputs the value C as the DC high voltage (digital value) to the VH sensor data update/binary averaging unit 28l and outputs the AD conversion end signal $ES_2$ to the VH sensor sampling timing generator/switching time determining unit 28k. In this case, the VH sensor data update/binary averaging unit 28l stores the value C, calculates the average value (B+C)/2 using the previously stored value B and the current value C, and stores the average value (B+C)/2. Thereafter, when the VH sensor sampling timing request signal DS is input from the voltage controller 28g, the VH sensor data update/binary averaging unit 28l outputs the average value (B+C)/2 to the voltage controller 28g.

For example, the switching timings $ST_5$ and $ST_6$ of the gate signal GS when the switching time of the gate signal GS is shorter than the AD conversion time will be described below. The VH sensor sampling timing generator/switching time determining unit 28k outputs the AD conversion start signal $SS_5$ at the switching timing $ST_5$. The AD converter 28m starts AD conversion. When the AD conversion ends, the AD converter 28m outputs a value F as the DC high voltage (digital value) to the VH sensor data update/binary averaging unit 28l and outputs the AD conversion end signal $ES_5$ to the VH sensor sampling timing generator/switching time determining unit 28k. In this case, the VH sensor data update/binary averaging unit 28l stores the value F, calculates the average value (E+F)/2 using the previously stored value E and the current value F, and stores the average value (E+F)/2. Then, since the switching timing $ST_6$ is before the AD conversion end signal $ES_5$, the VH sensor sampling timing generator/switching time determining unit 28k does not output the AD conversion start signal at the switching timing $ST_6$. Therefore, the AD converter 28m does not perform AD conversion at the switching timing $ST_6$. The VH sensor data update/binary averaging unit 28l continuously stores the value F as the latest DC high voltage and (E+F)/2 as the latest average value. Thereafter, when the VH sensor sampling timing request signal DS is input from the voltage controller 28g, the VH sensor data update/binary averaging unit 28l outputs the average value (E+F)/2 to the voltage controller 28g. Then, at the next switching timing $ST_7$, the VH sensor sampling timing generator/switching time determining unit 28k outputs the averaging inhibition signal RS before the switching timing $ST_8$. The VH sensor data update/binary averaging unit 28l inhibits the calculation of the average value in response to the averaging inhibition signal RS and continuously stores the previous average value (E+F)/2. In addition, the VH sensor sampling timing generator/switching time determining unit 28k outputs the AD conversion start signal $SS_7$ at the switching timing $ST_7$ and the AD converter 28m starts AD conversion. When the AD conversion ends, the AD converter 28m outputs a value H as the DC high voltage (digital value) to the VH sensor data update/binary averaging unit 28l and outputs the AD conversion end signal $ES_7$ to the VH sensor sampling timing generator/switching time determining unit 28k. In this case, the VH sensor data update/binary averaging unit 28l stores the value H and inhibits the calculation of the average value. Thereafter, when the VH sensor sampling timing request signal DS is input from the voltage controller 28g, the VH sensor data update/binary averaging unit 28l outputs the average value (E+F)/2 to the voltage controller 28g. The average value (E+F)/2 is the previous value, but is the intermediate value between the peak and trough of the DC high voltage VH. Therefore, the average value (E+F)/2 is close to the expected value $VH_E$ of the DC high voltage.

The two-motor system 2 (in particular, the boost control of the motor ECU 28) according to this embodiment has the same effect as the two-motor system 1 according to the first embodiment. In particular, even when the AD conversion time is shorter than the switching time of the gate signal GS, the two-motor system 2 according to the second embodiment stops AD conversion and inhibits the calculation of the average value VHA of the DC high voltage VH. In the boost control, the two-motor system 2 uses the previous value of the average value VHA of the DC high voltage VH. Since the previous value of the average value VHA is close to the expected value $VH_E$ of the DC high voltage, it is possible to perform stable voltage conversion control.

Figure 8:
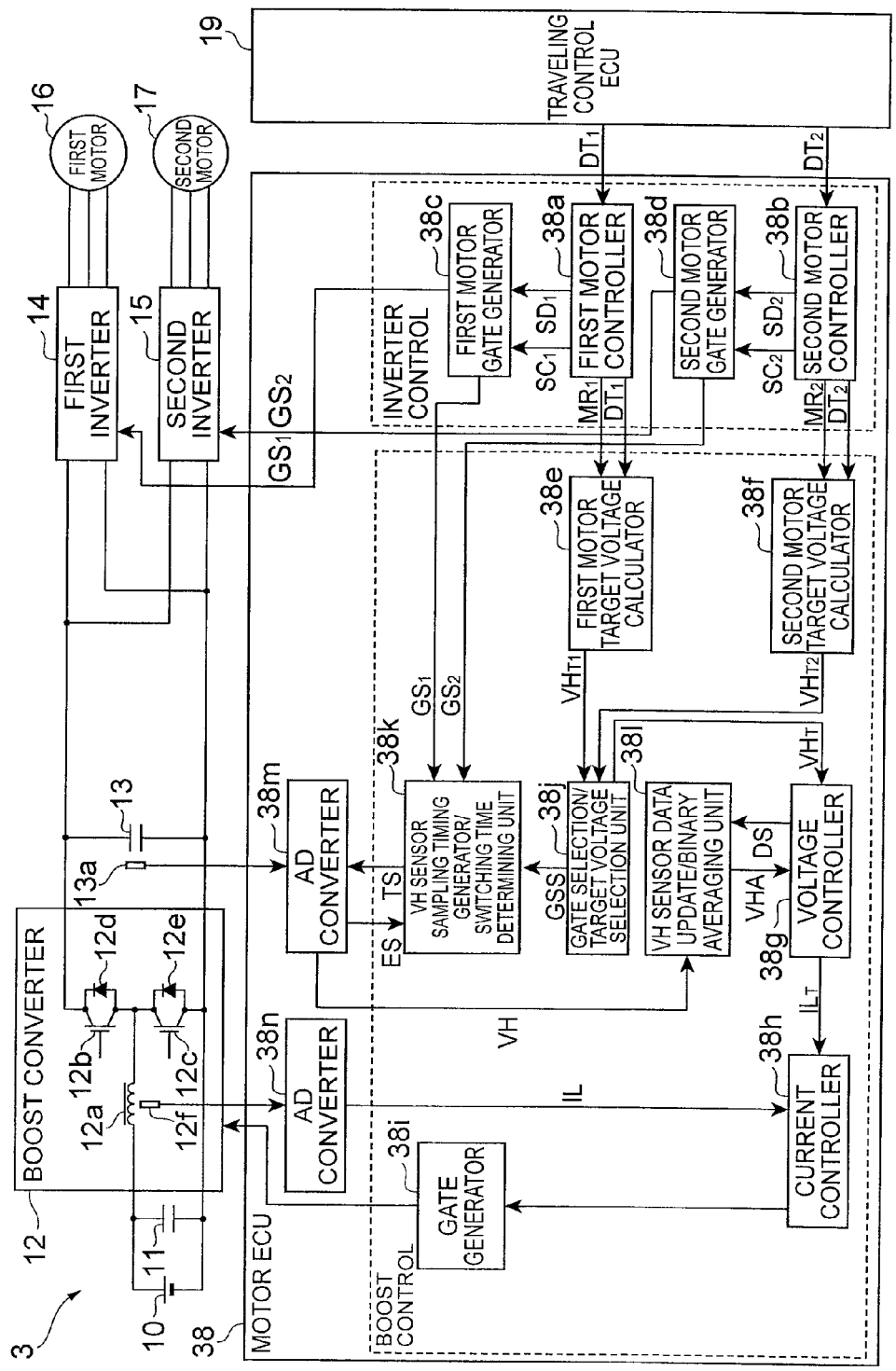
FIG. 8 a block diagram illustrating the structure of a two-motor system according to a third embodiment.
Figure 9:
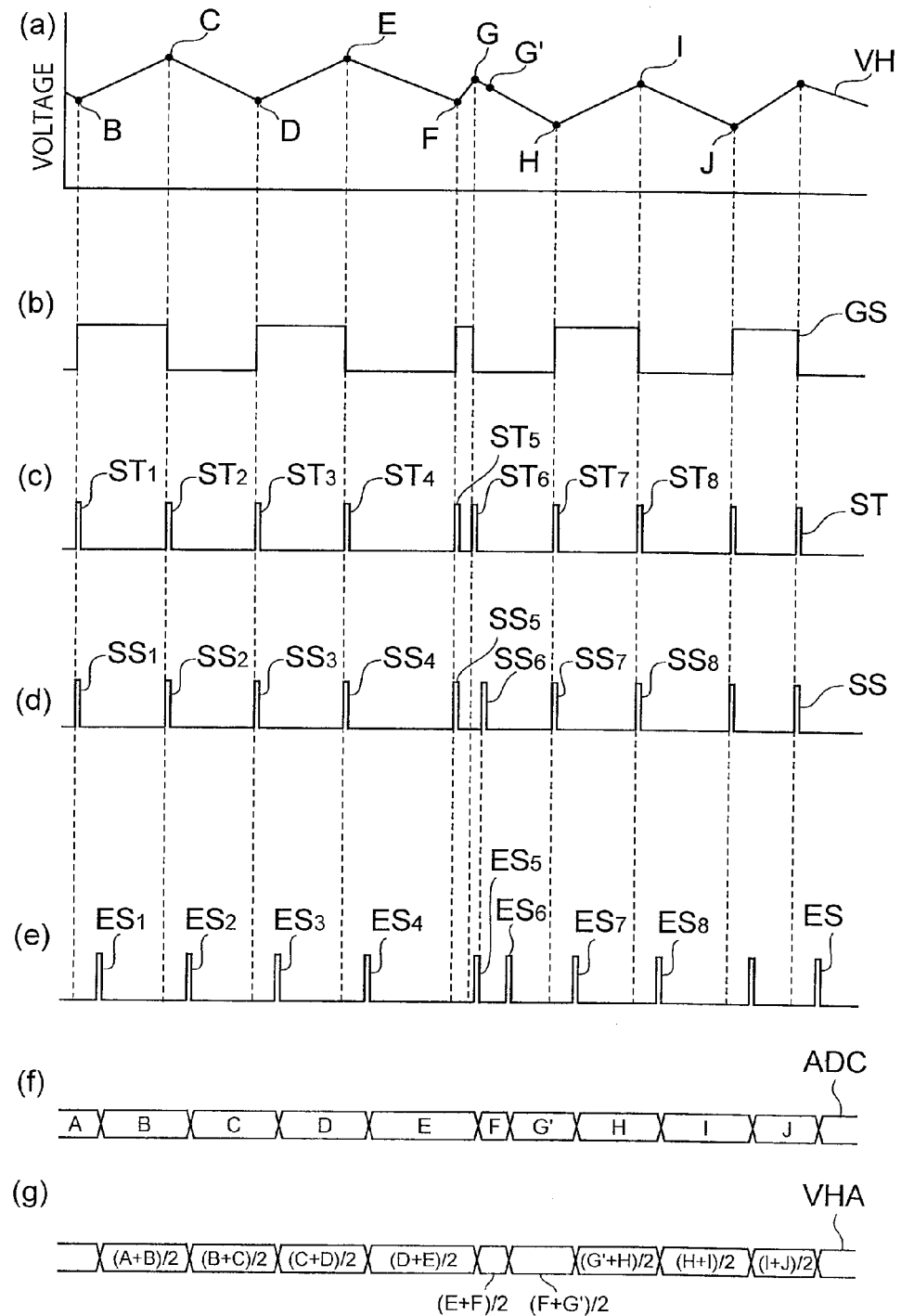
FIG. 9 is a diagram illustrating the sampling timing of a DC high voltage according to the third embodiment.
Figure 10:
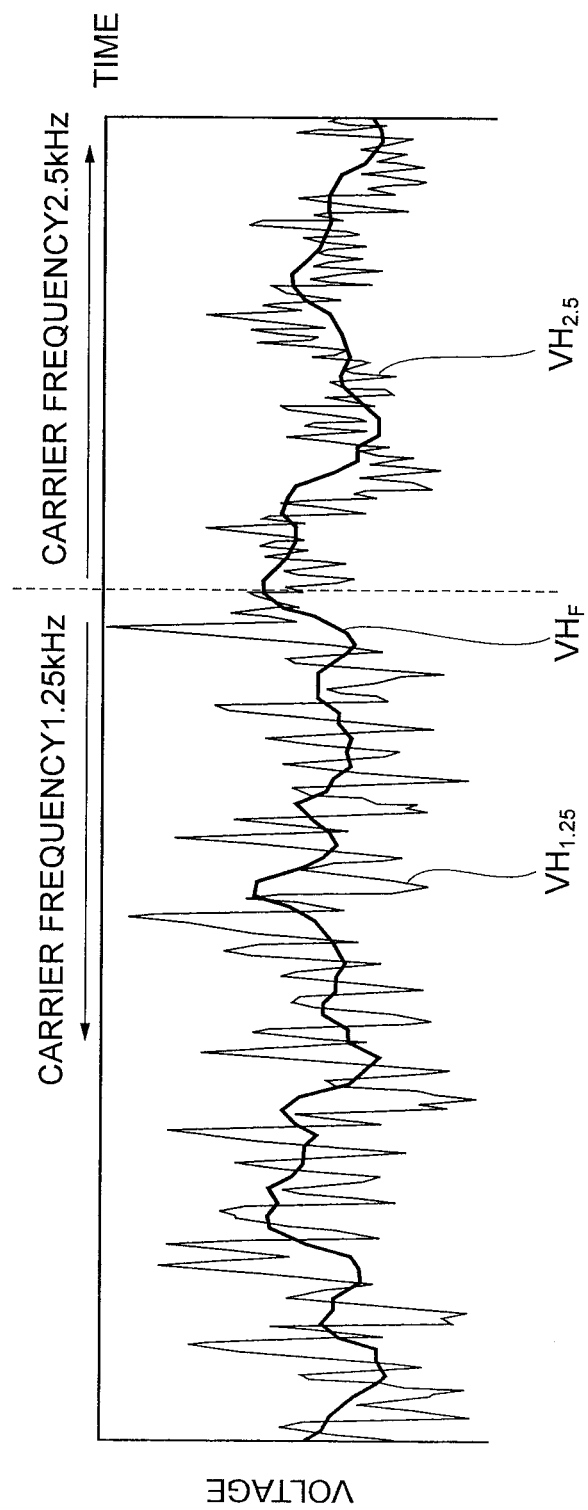
FIG. 10 is a diagram illustrating a variation in the DC high voltage when a carrier frequency is high and low.
Figure 11:
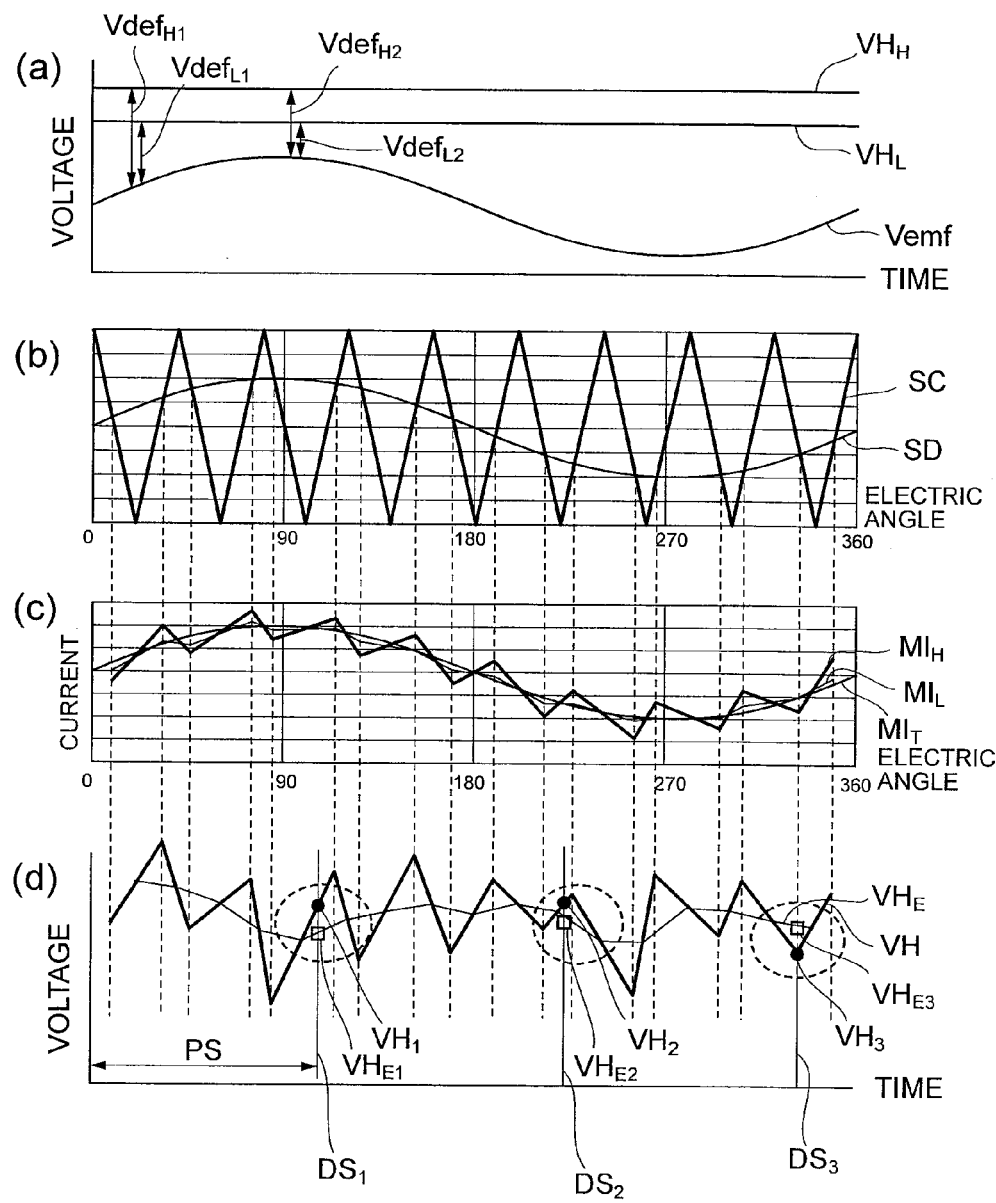
FIG. 11 is a diagram illustrating the occurrence of the pulsation of the DC high voltage.

Next a two-motor system 3 according to a third embodiment will be described with reference to FIGS. 8 and 9. FIG. 8 is a block diagram illustrating the structure of the two-motor system according to the third embodiment. FIG. 9 is a diagram illustrating the sampling timing of a DC high voltage according to the third embodiment. Specifically, FIG. 9(a) shows the DC high voltage, FIG. 9(b) shows a gate signal in inverter control, FIG. 9(c) shows the switching timing of the gate signal, FIG. 9(d) shows an AD conversion start signal to an AD converter, FIG. 9(e) shows an AD conversion end signal from the AD converter, FIG. 9(f) shows the AD-converted value of the AD converter, and FIG. 9(g) shows a binary average value.

The two-motor system 3 includes a battery 10, a filter capacitor 11, a boost converter 12, a smoothing capacitor 13, a first inverter 14, a second inverter 15, a first motor 16, a second motor 17, and a motor ECU 38. The two-motor system 3 differs from the two-motor system 1 according to the first embodiment only in the control operation of the motor ECU 38. When an AD conversion time is shorter than the ON/OFF switching time of the gate signal GS, the motor ECU 38 starts AD conversion immediately after AD conversion ends. In this embodiment, only the motor ECU 38 will be described in detail.

The motor ECU 38 is an electronic control unit including, for example, a microcomputer and various kinds of memories and performs motor control. In particular, the motor ECU 38 has an inverter control function (a first motor controller 38a, a second motor controller 38b, a first motor gate generator 38c, and a second motor gate generator 38d) for controlling the inverters 14 and 15 and a boost control function (a first motor target voltage calculator 38e, a second motor target voltage calculator 38f, a voltage controller 38g, a current controller 38h, a gate generator 38i, a gate selection/target voltage selection unit 38j, a VH sensor sampling timing generator/switching time determining unit 38k, and a VH sensor data update/binary averaging unit 38l) for controlling the boost converter 12. The inverter control function and the boost control function may be implemented by the same microcomputer or different microcomputers. In third embodiment, the first motor target voltage calculator 38e and the second motor target voltage calculator 38f correspond to target voltage setting unit described in the claims, the gate selection/target voltage selection unit 38j corresponds to selection unit described in the claims, the VH sensor sampling timing generator/switching time determining unit 38k corresponds to sampling timing generating unit described in the claims, the voltage controller 38g corresponds to control unit described in the claims. The VH sensor 13a, the AD converter 38m, and the VH sensor data update/binary averaging unit 38l correspond to sampling unit described in the claims and the AD converter 38m corresponds to AD conversion unit described in the claims.

The first motor controller 38a, the second motor controller 38b, the first motor gate generator 38c, the second motor gate generator 38d, the first motor target voltage calculator 38e, the second motor target voltage calculator 38f, the voltage controller 38g, the current controller 38h, the gate generator 38i, the gate selection/target voltage selection unit 38j, the VH sensor data update/binary averaging unit 38l, and the AD converter 38n performs the same processes as the first motor controller 18a, the second motor controller 18b, the first motor gate generator 18c, the second motor gate generator 18d, the first motor target voltage calculator 18e, the second motor target voltage calculator 18f, the voltage controller 18g, the current controller 18h, the gate generator 18i, the gate selection/target voltage selection unit 18j, the VH sensor data update/binary averaging unit 18l, and the AD converter 18n according to the first embodiment and thus a description thereof will not be repeated.

The VH sensor sampling timing generator/switching time determining unit 38k receives a first gate signal $GS_1$ from the first motor gate generator 38c and a second gate signal $GS_2$ from the second motor gate generator 38d in the inverter control function, receives an AD conversion end signal ES from the AD converter 38m, and receives a gate selection signal GSS from the gate selection/target voltage selection unit 38j. Then, the VH sensor sampling timing generator/switching time determining unit 38k selects the gate signal of the motor with a target voltage which has not been selected as the target voltage $VH_T$ of the two-motor system 2 as the gate signal $GS_S$ used to generate the VH sensor sampling timing TS from the first gate signal $GS_1$ and the second gate signal $GS_2$ on the basis of the gate selection signal GSS. The VH sensor sampling timing generator/switching time determining unit 38k outputs the VH sensor sampling timing TS (AD conversion start signal) to the AD converter 38m as follows on the basis of the AD conversion end signal ES for the VH sensor sampling timing TS (AD conversion start signal) and the next ON/OFF switching timing of the gate signal $GS_S$, whenever the VH sensor sampling timing TS (AD conversion start signal) is output. When the next ON/OFF switching timing of the gate signal $GS_S$ is after the AD conversion end signal ES, the VH sensor sampling timing generator/switching time determining unit 38k outputs the VH sensor sampling timing TS (AD conversion start signal) to the AD converter 38m at the next ON/OFF switching timing of the gate signal $GS_S$. When the next ON/OFF switching timing of the gate signal $GS_S$ is before the AD conversion end signal ES, the VH sensor sampling timing generator/switching time determining unit 38k outputs the VH sensor sampling timing TS (AD conversion start signal) to the AD converter 38m in response to the AD conversion end signal ES. Whenever the VH sensor sampling timing TS is input from the VH sensor sampling timing generator/switching time determining unit 38k, the AD converter 38m performs AD conversion on the DC high voltage (analog value) VH detected by the VH sensor 13a and outputs the AD-converted DC high voltage (digital value) VH to the VH sensor data update/binary averaging unit 38l. When the AD conversion ends, the AD converter 38m outputs the AD conversion end signal ES to the VH sensor sampling timing generator/switching time determining unit 38k. In particular, when the next ON/OFF switching timing of the gate signal $GS_S$ is before the AD conversion end signal ES (when the switching time of the gate signal $GS_S$ is shorter than the AD conversion time), the AD converter 38m starts the AD conversion immediately after the AD conversion ends.

Next, a process of calculating the average value VHA of the DC high voltage VH at the continuous ON/OFF switching timing of the gate signal GS when the switching time of the gate signal GS of the motor with the target voltage which has not been selected as the target voltage $VH_T$ is longer than the AD conversion time and when the switching time of the gate signal GS is shorter than the AD conversion time in the boost control function will be described with reference to FIG. 9.

FIG. 9(a) shows the DC high voltage VH, FIG. 9(b) shows the gate signal GS, and FIG. 9(c) shows the ON/OFF switching timing ST of the gate signal GS. FIG. 9(a) shows a value B, a value C, a value D, . . . as the DC high voltage values at switching timings $ST_1$, $ST_2$, $ST_3$, . . . . In addition, FIG. 9(d) shows AD conversion start signals $SS_1$, $SS_2$, $SS_3$, . . . output from the VH sensor sampling timing generator/switching time determining unit 38k at the switching timings $ST_1$, $ST_2$, $ST_3$, . . . . FIG. 9(e) shows AD conversion end signals $ES_1$, $ES_2$, $ES_3$, . . . output from the AD converter 38m when AD conversion which is performed in response to the AD conversion start signals $SS_1$, $SS_2$, $SS_3$, . . . ends. FIG. 9(f) shows a value A, a value B, a value C, a value D, . . . , which are the AD-converted DC voltage values ADC which have been output from the AD converter 38m and then stored in the VH sensor data update/binary averaging unit 38l. FIG. 9(g) shows (A+B)/2, (B+C)/2, . . . , which are the average values VHA of the DC high voltage values which have been calculated by the VH sensor data update/binary averaging unit 38l and then stored. When the switching time of the gate signal GS is longer than the AD conversion time, the same process as that in the second embodiment is performed and thus a description thereof will not be repeated.

For example, the switching timings $ST_5$ and $ST_6$ of the gate signal GS when the switching time of the gate signal GS is shorter than the AD conversion time will be described below. The VH sensor sampling timing generator/switching time determining unit 38k outputs the AD conversion start signal $SS_5$ at the switching timing $ST_5$. The AD converter 38m starts AD conversion. When the AD conversion ends, the AD converter 28m outputs a value F as the DC high voltage (digital value) to the VH sensor data update/binary averaging unit 38l and outputs the AD conversion end signal $ES_5$ to the VH sensor sampling timing generator/switching time determining unit 38k. In this case, the VH sensor data update/binary averaging unit 38l stores the value F, calculates the average value (E+F)/2 using the previously stored value E and the current value F, and stores the average value (E+F)/2. Then, since the switching timing $ST_6$ is before the AD conversion end signal $ES_5$, the VH sensor sampling timing generator/switching time determining unit 38k temporarily waits for the output of the AD conversion start signal at the switching timing $ST_6$. When the AD conversion end signal $ES_5$ is input, the VH sensor sampling timing generator/switching time determining unit 38k outputs the AD conversion start signal $SS_6$. The AD converter 38m starts AD conversion in response to the AD conversion start signal $SS_6$ (therefore, the AD converter 38m performs AD conversion immediately after AD conversion ends). When the AD conversion ends, the AD converter 38m outputs a value G' as the DC high voltage (digital value) to the VH sensor data update/binary averaging unit 38l and outputs the AD conversion end signal $ES_6$ to the VH sensor sampling timing generator/switching time determining unit 38k. The value G' is slightly smaller than a value G, but is close to the value G at the switching timing $ST_6$ of the gate signal GS at the DC high voltage VH. In this case, the VH sensor data update/binary averaging unit 38l stores the value G', calculates the average value (F+G')/2 using the previously stored value F and the current value G', and stores the average value (F+G')/2. Thereafter, when the VH sensor sampling timing request signal DS is input from the voltage controller 38g, the VH sensor data update/binary averaging unit 38l outputs the average value (F+G')/2 to the voltage controller 38g. The average value (F+G')/2 is close to the expected value of the DC high voltage value since the value G' is slightly smaller than the value G at the peak of the DC high voltage VH and is the average value between the value G and the value F at the trough of the DC high voltage.

The two-motor system 3 (in particular, the boost control of the motor ECU 38) according to this embodiment has the same effect as the two-motor system 1 according to the first embodiment. In particular, even when the AD conversion time is shorter than the switching time of the gate signal GS, the two-motor system 3 according to the third embodiment performs AD conversion immediately after AD conversion ends, calculates the average value VHA using the DC high voltage VH obtained by the AD conversion, and uses the average value VHA for boost control. Since the average value VHA calculated using the DC high voltage VH which is obtained by the AD conversion is also close to the expected value of the DC high voltage, it is possible to perform stable voltage conversion control.

The embodiments of the invention have been described above, but the invention is not limited to the above-described embodiments. Various modifications of the invention can be made.

For example, the embodiments are applied to the vehicle with the two-motor system, but may be applied to various devices, such as devices and moving bodies with the two-motor system. In addition, the embodiments may be applied to motor systems including three or more motors. Motor generators or generators can be applied as a plurality of motors.

The embodiments are applied to the boost control for the boost converter. However, the embodiments may be applied to step-down control for a step-down converter and step-up/down control for a step-up/down converter.

In the embodiments, three methods of setting the sampling timing of the DC high voltage used for boost control using the gate signal of the inverter control are described. However, other setting methods using the gate signal for inverter control may be used.

In the embodiments, the higher one of the target voltages of two motors is selected as the target voltage of the system and the sampling timing is set using the gate signal of the motor with the target voltage which has not been selected as the target voltage of the system. However, in a system including three or more motors, one of the target voltages of the three or more motors is selected as the target voltage of the system, the gate signal of the motor which has the largest effect on the pulsation of a motor current is selected from the gate signals of a plurality of motors with the target voltages which have not been selected as the target voltage of the system, and the selected gate signal is used to set the sampling timing.

INDUSTRIAL APPLICABILITY

The invention provides a motor voltage conversion control device that performs voltage conversion control on a voltage conversion circuit which converts a DC voltage of a power supply into an input DC voltage required to drive motors between a motor control circuit which controls a plurality of motors and the power supply. The input DC voltage used for the voltage conversion control is sampled considering a gate signal of the motor with a target voltage which has not been selected as the target voltage of the input DC voltage converted by the voltage conversion circuit. In this way, even when the input DC voltage of the motor pulsates, it is possible to sample an input DC voltage close to the expected value of the input DC voltage corresponding to a sampling timing request. Therefore, the difference between the expected value of the input DC voltage and the sampling value which is actually used in the voltage conversion control is small and it is possible to perform stable voltage conversion control.

Reference Signs List 1, 2, 3: TWO-MOTOR SYSTEM
10: BATTERY
11: FILTER CAPACITOR
12: BOOST CONVERTER
12a: REACTOR
12b, 12c: SWITCHING ELEMENT
12d, 12e: FREE WHEEL DIODE
12f: IL SENSOR
13: SMOOTHING CAPACITOR
13a: VH SENSOR
14: FIRST INVERTER
15: SECOND INVERTER
16: FIRST MOTOR
17: SECOND MOTOR
18, 28, 38: MOTOR ECU
18a, 28a, 38a: FIRST MOTOR CONTROLLER
18b, 28b, 38b: SECOND MOTOR CONTROLLER
18c, 28c, 38c: FIRST MOTOR GATE GENERATOR
18d, 28d, 38d: SECOND MOTOR GATE GENERATOR
18e, 28e, 38e: FIRST MOTOR TARGET VOLTAGE CALCULATOR
18f, 28f, 38f: SECOND MOTOR TARGET VOLTAGE CALCULATOR
18g, 28g, 38g: VOLTAGE CONTROLLER
18h, 28h, 38h: CURRENT CONTROLLER
18i, 28i, 38i: GATE GENERATOR
18j, 28j, 38j: GATE SELECTION/TARGET VOLTAGE SELECTION UNIT
18k: VH SENSOR SAMPLING TIMING GENERATOR
28k, 38k: VH SENSOR SAMPLING TIMING GENERATOR/SWITCHING TIME DETERMINING UNIT
18l, 28l, 38l: VH SENSOR DATA UPDATE/BINARY AVERAGING UNIT
18m, 18n, 28m, 28n, 38m, 38n: AD CONVERTER
19: TRAVELING CONTROL ECU

The invention claimed is:

1. A motor voltage conversion control device that performs voltage conversion control on a voltage conversion circuit which converts a DC voltage of a power supply into an input DC voltage required to drive motors between a motor control circuit which controls a plurality of motors and the power supply, comprising:
sampling unit for detecting a voltage between both ends of a capacitor which is provided between the motor control circuit and the voltage conversion circuit and sampling the input DC voltage converted by the voltage conversion circuit;
target voltage setting unit for setting a target voltage of the input DC voltage of each of the motors;
selection unit for selecting the target voltage to be converted by the voltage conversion circuit among a plurality of target voltages set by the target voltage setting unit;
sampling timing generating unit for generating sampling timing when the input DC voltage converted by the voltage conversion circuit is sampled, on the basis of a gate signal for motor control for any one of the motors with the target voltages which have not been selected by the selection unit; and control unit for performing the voltage conversion control using the input DC voltage sampled by the sampling unit at the sampling timing which is generated by the sampling timing generating unit in response to each sampling timing request in the voltage conversion control.

2. The motor voltage conversion control device according to claim 1,
wherein the sampling timing generating unit generates the sampling timing at the ON/OFF switching timing of the gate signal,
whenever the sampling timing generating unit generates the sampling timing, the sampling unit calculates an average value between the input DC voltage converted by the voltage conversion circuit at a current sampling timing and the input DC voltage converted by the voltage conversion circuit at a previous sampling timing, and
the control unit performs the voltage conversion control using the average value of the input DC voltages which is calculated by the sampling unit immediately before the sampling timing request, in response to each sampling timing request in the voltage conversion control.

3. The motor voltage conversion control device according to claim 2, further comprising:
AD conversion unit for converting the input DC voltage converted by the voltage conversion circuit from an analog value to a digital value whenever the sampling timing generating unit generates the sampling timing,
wherein, when the ON/OFF switching time of the gate signal is shorter than an AD conversion time of the AD conversion unit, the sampling timing generating unit stops the generation of the sampling timing and the AD conversion unit does not perform the AD conversion.

4. The motor voltage conversion control device according to claim 2, further comprising:
AD conversion unit for converting the input DC voltage converted by the voltage conversion circuit from an analog value to a digital value whenever the sampling timing generating unit generates the sampling timing,
wherein, when the ON/OFF switching time of the gate signal is shorter than an AD conversion time of the AD conversion unit, the sampling timing generating unit generates the sampling timing immediately after the AD conversion of the AD conversion unit ends, and the AD conversion unit starts the AD conversion immediately after the AD conversion ends.

5. The motor voltage conversion control device according to claim 1,
wherein the plurality of motors are two motors,
the target voltage setting unit sets the target voltages of the two motors,
the selection unit selects the target voltage to be converted by the voltage conversion circuit from the target voltages of the two motors set by the target voltage setting unit, and
the sampling timing generating unit generates the sampling timing when the input DC voltage converted by the voltage conversion circuit is sampled, on the basis of a gate signal of the motor with the target voltage which has not been selected by the selection unit.

* * * * *